(12) United States Patent
Wilson et al.

(10) Patent No.: US 6,710,862 B1
(45) Date of Patent: Mar. 23, 2004

(54) METHOD OF DETERMINING THE LOCATION OF SPLICES AND OF CALCULATING POWER LOSS AT SPLICES IN OPTIC FIBERS IN A CABLE

(75) Inventors: David Lewis Wilson, Syracuse, NY (US); Gregory Soule, Clinton, NY (US)

(73) Assignee: NetTest (New York) Inc., Utica, NY (US)

( * ) Notice: Subject to any disclaimer, the term of this patent is extended or adjusted under 35 U.S.C. 154(b) by 60 days.

(21) Appl. No.: 09/945,209

(22) Filed: Aug. 31, 2001

(51) Int. Cl.[7] ............................................... G01N 21/00
(52) U.S. Cl. ...................................................... 356/73.1
(58) Field of Search ......................................... 356/73.1

(56) References Cited

U.S. PATENT DOCUMENTS

| | | | | |
|---|---|---|---|---|
| 5,066,118 A | * | 11/1991 | Buerli | 356/73.1 |
| 5,131,743 A | * | 7/1992 | Kaneko et al. | 356/73.1 |
| 5,179,420 A | * | 1/1993 | So et al. | 356/73.1 |
| 5,731,869 A | * | 3/1998 | Minami | 356/73.1 |
| 6,157,443 A | * | 12/2000 | Jennings et al. | 356/73.1 |
| 6,388,741 B1 | * | 5/2002 | Beller | 356/73.1 |

* cited by examiner

*Primary Examiner*—Tu T. Nguyen

(57) ABSTRACT

A method of determining the location of splices and of calculating event start and end locations, the type of loss estimate, and LSA cursors locations and lengths, which will be used to calculate the power loss at splices in optic fibers in a cable.

10 Claims, 38 Drawing Sheets

Smart Splice Trace:C:\ITGNAO\5itgnao.sst

Number of Splices : 50
Loss Threshold(dB) : 0.100
Min Frequency : 1

X Adjust for Helix Factor
X Event Frequency into Waveform

| Event Number | Loss Mode | Event Type | Cable Event Location (km) | Width (km) | Frequency | Trace | Location (km) | Width (km) | Loss (dB) |
|---|---|---|---|---|---|---|---|---|---|
| 1 | Splice Loss | Non-Reflectice | 6.8313 | 1.1631 | 3 | 5itgnao.005 | 6.8313 | 1.0648 | 0.10 |
| | | | | | | 5itgnao.001 | 6.8641 | 1.0648 | -0.12 |
| | | | | | | 5itgnao.004 | 6.9296 | 1.0648 | 0.34 |
| 2 | Splice Loss | Non-Reflective | 14.4818 | 1.0812 | 3 | 5itgnao.006 | 14.4818 | 1.0648 | 0.14 |
| | | | | | | 5itgnao.001 | 14.4982 | 1.0648 | 0.24 |
| | | | | | | 5itgnao.002 | 14.5009 | 1.0650 | 0.27 |
| 3 | Splice Loss | Non-Reflective | 26.7028 | 1.1304 | 4 | 5itgnao.001 | 26.7028 | 1.0648 | -0.13 |
| | | | | | | 5itgnao.005 | 26.7356 | 1.0648 | 0.23 |
| | | | | | | 5itgnao.004 | 26.6356 | 1.0648 | 0.29 |
| | | | | | | 5itgnao.002 | 26.7734 | 1.0650 | -0.11 |
| 4 | Splice Loss | Non-Reflective | 33.0263 | 1.0976 | 3 | 5itgnao.001 | 33.0263 | 1.0648 | 0.40 |
| | | | | | | 5itgnao.002 | 33.0326 | 1.0650 | 0.11 |
| | | | | | | 5itgnao.003 | 33.0591 | 1.0648 | 0.21 |
| 5 | Splice Loss | Non-Reflective | 45.2310 | 1.1304 | 5 | 5itgnao.005 | 45.2310 | 1.0648 | 0.14 |
| | | | | | | 5itgnao.003 | 45.2474 | 1.0648 | 0.11 |
| | | | | | | 5itgnao.004 | 45.2638 | 1.0648 | 0.15 |
| | | | | | | 5itgnao.002 | 45.2723 | 1.0650 | 0.24 |
| | | | | | | 5itgnao.006 | 45.2965 | 1.0648 | 0.26 |
| 6 | Splice Loss | Non-Reflective | 57.1080 | 1.1467 | 2 | 5itgnao.001 | 57.1080 | 1.0648 | -0.10 |
| | | | | | | 5itgnao.002 | 57.2007 | 1.0650 | -0.21 |
| 7 | Splice Loss | Non-Reflective | 61.5967 | 1.0812 | 2 | 5itgnao.006 | 61.5967 | 1.0648 | 0.12 |
| | | | | | | 5itgnao.001 | 61.6131 | 1.0648 | 0.22 |
| 8 | Splice Loss | Non-Reflective | 63.8411 | 1.0648 | 2 | 5itgnao.003 | 63.8411 | 1.0648 | 0.27 |
| | | | | | | 5itgnao.004 | 63.8411 | 1.0648 | 0.37 |
| 9 | Splice Loss | Non-Reflective | 70.2956 | 1.0812 | 4 | 5itgnao.004 | 70.2956 | 1.0648 | -0.23 |
| | | | | | | 5itgnao.005 | 70.2956 | 1.0648 | -0.16 |
| | | | | | | 5itgnao.006 | 70.3120 | 1.0648 | 0.11 |
| | | | | | | 5itgnao.002 | 70.3253 | 1.0650 | 0.29 |
| 10 | Splice Loss | Non-Reflective | 80.4197 | 1.9822 | 3 | 5itgnao.003 | 80.4197 | 1.9822 | 0.11 |
| | | | | | | 5itgnao.006 | 80.4361 | 1.0648 | 0.11 |
| | | | | | | 5itgnao.002 | 80.4841 | 1.0650 | -0.14 |

Fig. 10

Sample Test Traces  1-Dir Splice Loss Summary Report  Cable : ITG-NAO
                                                        Trace List : all.trl Reference : stitgano.trc ITG —> NAO     Correlation % : 4.00
                                        Length : 86.6122 km    Wavelength(nm) : 1550

Cable : ITG-NAO   ITG <—> NAO
                  Utica Site ITG <—> Syracuse Site NAO Splice Number / ITG—>NAO Loc(km)

| Fiber Number | 001 6.80 | 002 14.40 | 003 26.70 | 004 33.00 | 005 45.20 | 006 57.10 | 007 61.50 | 008 63.70 | 009 70.30 | 010 80.40 | Avg | Min | Max | End-End(dB) |
|---|---|---|---|---|---|---|---|---|---|---|---|---|---|---|
| 001 | -0.12 | 0.24 | -0.13 | 0.40 | -0.01 | -0.10 | 0.06 | -0.06 | 0.04 | 0.04 | 0.05 | -0.13 | 0.40 | 18.15 |
| 002 | -0.02 | 0.27 | -0.11 | 0.11 | 0.24 | -0.21 | 0.04 | 0.04 | 0.29 | -0.14 | 0.05 | -0.21 | 0.29 | 17.89 |
| 003 | -0.06 | 0.06 | -0.04 | 0.21 | 0.11 | -0.10 | 0.05 | 0.27 | 0.03 | 0.11 | 0.06 | -0.10 | 0.27 | 17.90 |
| 004 | 0.34 | -0.01 | 0.29 | -0.05 | 0.15 | 0.09 | 0.10 | 0.37 | -0.23 | -0.03 | 0.08 | -0.23 | 0.37 | 18.11 |
| 005 | 0.10 | -0.01 | 0.23 | 0.03 | 0.14 | -0.08 | 0.10 | 0.05 | -0.16 | 0.09 | 0.05 | -0.16 | 0.23 | 17.82 |
| 006 | -0.01 | 0.14 | 0.01 | -0.04 | 0.26 | -0.04 | 0.07 | -0.07 | 0.11 | 0.11 | 0.06 | -0.07 | 0.26 | 18.00 |
| Average | 0.04 | 0.11 | 0.04 | 0.11 | 0.15 | -0.07 | 0.07 | 0.10 | 0.01 | 0.03 | 0.06 | | | 17.98 |
| Min | -0.12 | -0.01 | -0.13 | -0.05 | -0.01 | -0.21 | 0.04 | -0.07 | -0.23 | -0.14 | | -0.23 | | 17.82 |
| Max | 0.34 | 0.27 | 0.29 | 0.40 | 0.26 | 0.09 | 0.10 | 0.37 | 0.29 | 0.11 | | | 0.40 | 18.15 |

Fig. 11
(Prior Art)

```
// Copyright (c) 2000  GN Nettest Laser Precision Div. - All Rights Reserved //
//////////////////////////////////////////////////////////////////////////////
//////////////////////////////////////////////////////////////////////////
//
// File:    SmartTmp.cpp
//
// Purpose:
// Implements Smart Splice Template Processing on selected traces :
//  . OnSmartTemplate  - Dialog control and start processing.
//  . SmartTemplate    - Generate Smart Template trace.
//  . Stats            - Tabulate statistics.
//  . PrintReport      - Print Smart Template Report.
//  . PrintPageHead    - Print Page Header.
//  . PrintReportHead  - Print Report Header.
//  . PrintTraceInfo   - Print Report Trace info.
//  . PrintFreqTblHead - Print Frequency Table Header.
//  . PrintEndTblHead  - Print End Locations Header.
//  . SortTLWL         - Sort Trace, Location, Width, and Loss info.
//  . Swap             - Swap double or CString.
//
//////////////////////////////////////////////////////////////////////////
#include "stdafx.h"
include "PC4000.h"
#include "..\\testnet\\iextappui.h"
#include "tdcommon.h"
#include "fas.h"
#include "fasdll.h"
#include "glblinc.h"
#include "TraceHeader.h"
#include "TraceData.h"
#include "TraceDoc.h"
#include "TrcListElement.h"
#include "TraceListDoc.h"
#include "TraceListView.h"
#include "TraceGraphBase.h"
#include "ZoomStack.h"
#include "TraceGraphView.h"
#include "CommonData.h"
#include "TraceGraph.h"
#include "DlgGenProgress.h"
#include "ParametersPage.h"
#include "AnalysisPage.h"
#include "TraceDisplay.h"
#include "SmartSpliceTemplate.h"
#include "Consistent.h"
#include "PageSetup.h"

#ifdef _DEBUG
#define new DEBUG_NEW
#undef THIS_FILE
static char THIS_FILE[] = __FILE__;
endif extern VOID FAS_convert_template_events(OTDR_TRACE *trc);
extern CPageSetup g_cPageSetup;

static void SmartTemplate();
static void SetupInfo    ();
static void PrintReport  ();

static void PrintPageHead    (CDC* pDC, int &nXPos, int &nYPos);
static void PrintReportHead  (CDC* pDC, int &nXPos, int &nYPos);
static void PrintTraceInfo   (CDC& pDC, int nX, int nY, int nFreqTblColWidth[],
                              CString csTrace, double dLoc,
                              double dWidth,   double dLoss);
static void PrintFreqTblHead (CDC* pDC, int &nXPos, int &nYPos,
                              int nHeadCenter[], int nFreqTblWidth);
static void PrintEndTblHead  (CDC* pDC, int &nXPos, int &nYPos,
                              int nCol1Center, int nCol2Start, int nWidth);

static void SortTLWL(int nEvents, CString csTrace[], double dLoc[],
                     double dWidth[], double dLoss[]);
static void Swap( double& dDouble1, double& dDouble2);
static void Swap(CString& csStg1,   CString& csStg2 );

static CTraceList* pListSelected;     // list of selected traces
static CTraceDoc*  pTraceDoc;          // Current Trace Doc.
static CTraceDoc*  pPrimary;           // Primary Trace Doc.

static int         nSelected;          // Number of traces selected.
```

*Fig. 14A*

```
//-----------------------------------------------------//
// Copyright (c) 2002  NetTest - All Rights Reserved    //
//-----------------------------------------------------//

///////////////////////////////////////////////////////
//
// File:   SmartTmp.cpp
//
// Purpose:
// Implements Smart Splice Template Processing on selected traces :
// . OnSmartTemplate - Dialog control and start processing.
// . SmartTemplate  - Generate Smart Template trace.
// . Stats          - Tabulate statistics.
// . PrintReport    - Print Smart Template Report.
// . PrintPageHead  - Print Page Header.
// . PrintReportHead - Print Report Header.
// . PrintTraceInfo  - Print Report Trace info.
// . PrintFreqTblHead- Print Frequency Table Header.
// . PrintEndTblHead - Print End Locations Header.
// . SortTLWL       - Sort Trace, Location, Width, and Loss info.
// . Swap           - Swap double or CString.
//
/////////////////////////////////////////////////////// include "stdafx.h"
include "PC4000.h"
#include "..\\testnet\\iextappui.h"
#include "tdcommon.h"
#include "fas.h"
#include "fasdll.h"
#include "glblinc.h"
#include "TraceHeader.h"
#include "TraceData.h"
#include "TraceDoc.h"
#include "TrcListElement.h"
#include "TraceListDoc.h"
#include "TraceListView.h"
#include "TraceGraphBase.h"
#include "ZoomStack.h"
#include "TraceGraphView.h"
#include "CommonData.h"
#include "TraceGraph.h"
#include "DlgGenProgress.h"
#include "ParametersPage.h"
#include "AnalysisPage.h"
```

Fig. 14A-1

```
#include "TraceDisplay.h"
#include "SmartSpliceTemplate.h"
#include "Consistent.h"
#include "PageSetup.h"

#ifdef _DEBUG
#define new DEBUG_NEW
#undef THIS_FILE
static char THIS_FILE[] = __FILE__;
endif extern VOID FAS_convert_template_events(OTDR_TRACE *trc);
extern CPageSetup g_cPageSetup;

static void SmartTemplate();
static void SetupInfo   ();
static void PrintReport ();

static void PrintPageHead   (CDC* pDC, int &nXPos, int &nYPos);
static void PrintReportHead (CDC* pDC, int &nXPos, int &nYPos);
static void PrintTraceInfo  (CDC& pDC, int nX, int nY, int nFreqTblColWidth[],
               CString csTrace, double dLoc,
               double dWidth,  double dLoss);
static void PrintFreqTblHead(CDC* pDC, int &nXPos, int &nYPos,
               int nHeadCenter[], int nFreqTblWidth);
static void PrintEndTblHead (CDC* pDC, int &nXPos, int &nYPos,
               int nCol1Center, int nCol2Start, int nWidth);

static void SortTLWL(int nEvents, CString csTrace[], double dLoc[],
              double  dWidth[],  double dLoss[]);
static void Swap( double& dDouble1, double& dDouble2);
static void Swap(CString& csStg1,  CString& csStg2 );

static CTraceList* pListSelected;      // list of selected traces
static CTraceDoc*  pTraceDoc;          // Current Trace Doc.
static CTraceDoc*  pPrimary;           // Primary Trace Doc.

static int       nSelected;            // Number of traces selected.
```

Fig. 14A-2

```
static int          nTracesUsed;              // Number of traces used.
static BOOL         bErrorInSmartTemplate;

#define LSA_MIN_KM   0.300     // Full LSA min distance for Splice Loss
                               //   else 2 Point Loss.
#define LSA_MAX_KM   3.000     // Full LSA max distance.

#define LSA_FRST_PCT 0.10      // First (front, left) % of LSA Interval removed.
#define LSA_MIDL_PCT 0.80      // Middle % of LAS Interval kept.
#define LSA_LAST_PCT 0.10      // Last (back, right) % of LSA Interval removed.

//------------------------------------------------------------------------
//
// Function: OnSmartTemplate(CTraceList* pList)    list of selected traces.
//
// Output:   If requested then Primary Trace made into a Template Trace based
//           on the selected events Frequency Distribution.
//.          Optionally, the Primary waveform may be replaced by the
//           Frequency Distribution.
//
// Purpose:  Process OnSmartTemplate command.
//
//    Processing:
//      Processes the OnSmartTemplate command :
//        . Setup and display the Smart Template dialog and obtain user inputs.
//        . Run SmartTemplate() function with progress dialog.
//
//------------------------------------------------------------------------
void CTraceListDoc::OnSmartTemplate(CTraceList* pList)
{
    CSmartSpliceTemplate dlg;
    BOOL bUserCancel;
    CTraceList lTrace;

CString csTitle;
    csTitle.LoadString(IDS_SMART_SPLICE_TEMPLATE);

// Set up Dialog defaults.
GetUserInputs:
    dlg.m_nNumSplices      = theApp.m_nSTNumSplices;
    dlg.m_dSTLossThres     = theApp.m_dSTLossThres;
    dlg.m_nMinFrequency    = theApp.m_nSTMinFrequency;
    dlg.m_bAdjustForHelix  = theApp.m_bSTAdjustForHelix;
    dlg.m_bEventFreqDist   = theApp.m_bSTEventFreqDist;
    dlg.m_bPrintReport     = theApp.m_bSTPrintReport;

if (dlg.DoModal() != IDOK)           // Display dialog as modal.
        return;                          // return if not OK.

theApp.m_nSTNumSplices     = dlg.m_nNumSplices;    // Save parameters.
    theApp.m_dSTLossThres      = dlg.m_dSTLossThres;
    theApp.m_nSTMinFrequency   = dlg.m_nMinFrequency;
    theApp.m_bSTAdjustForHelix = dlg.m_bAdjustForHelix;
    theApp.m_bSTEventFreqDist  = dlg.m_bEventFreqDist;
    theApp.m_bSTPrintReport    = dlg.m_bPrintReport;

pPrimary = m_pPrimaryTrace->GetDocument(FALSE);    // Must have primary.

pListSelected = pList;
    nSelected     = pListSelected->GetCount();

// Run SmartTemplate with progress dialog.
    bUserCancel = !RunWithProgressInit(SmartTemplate, &csTitle,
                       theApp.m_hInstance, theApp.m_pMainWnd->m_hWnd);

// Notify others - Primary updated as if new FAS and optionally new data..
    lTrace.AddTail(m_pPrimaryTrace);
    theApp.m_pTraceList->UpdateAllViews(NULL, NewFASHint, &lTrace);
    if (theApp.m_bSTEventFreqDist)
        theApp.m_pTraceList->UpdateAllViews(NULL, NewDataHint, &lTrace);

if (bUserCancel || bErrorInSmartTemplate)
        goto GetUserInputs;

return;
}

//------------------------------------------------------------------------
//
// Function: SmartTemplate()
//
```

*Fig. 14B*

```
static int      nTracesUsed;      // Number of traces used.
static BOOL     bErrorInSmartTemplate;

#define LSA_MIN_KM   0.300    // Full LSA min distance for Splice Loss
                              // else 2 Point Loss.
#define LSA_MAX_KM   3.000    // Full LSA max distance.

#define LSA_FRST_PCT  0.10    // First (front, left) % of LSA Interval removed.
#define LSA_MIDL_PCT  0.80    // Middle % of LAS Interval kept.
#define LSA_LAST_PCT  0.10    // Last (back, right) % of LSA Interval removed.

//-----------------------------------------------------------------
//
// Function: OnSmartTemplate(CTraceList* pList)   list of selected traces.
//
// Output:   If requested then Primary Trace made into a Template Trace based
//           on the selected events Frequency Distribution.
//           Optionally, the Primary waveform may be replaced by the
//           Frequency Distribution.
//
// Purpose:  Process OnSmartTemplate command.
//
// Processing:
//    Processes the OnSmartTemplate command :
//    . Setup and display the Smart Template dialog and obtain user inputs.
//    . Run SmartTemplate() function with progress dialog.
//
//----------------------------------------------------------------- void CTraceListDoc::OnSmartTemplate(CTraceList* pList)
{
    CSmartSpliceTemplate dlg;
    BOOL bUserCancel;
    CTraceList lTrace;

CString csTitle;
    csTitle.LoadString(IDS_SMART_SPLICE_TEMPLATE);

// Set up Dialog defaults.
GetUserInputs:
    dlg.m_nNumSplices    = theApp.m_nSTNumSplices;
    dlg.m_dSTLossThres   = theApp.m_dSTLossThres;
    dlg.m_nMinFrequency  = theApp.m_nSTMinFrequency;
```

Fig. 14B-1

```
dlg.m_bAdjustForHelix   = theApp.m_bSTAdjustForHelix;
dlg.m_bEventFreqDist    = theApp.m_bSTEventFreqDist;
dlg.m_bPrintReport      = theApp.m_bSTPrintReport;

if (dlg.DoModal() != IDOK)          // Display dialog as modal.
    return;                         // return if not OK.

theApp.m_nSTNumSplices    = dlg.m_nNumSplices;      // Save parameters.
theApp.m_dSTLossThres     = dlg.m_dSTLossThres;
theApp.m_nSTMinFrequency  = dlg.m_nMinFrequency;
theApp.m_bSTAdjustForHelix = dlg.m_bAdjustForHelix;
theApp.m_bSTEventFreqDist = dlg.m_bEventFreqDist;
theApp.m_bSTPrintReport   = dlg.m_bPrintReport;

pPrimary = m_pPrimaryTrace->GetDocument(FALSE);     // Must have primary.

pListSelected = pList;
nSelected     = pListSelected->GetCount();

// Run SmartTemplate with progress dialog.
bUserCancel = !RunWithProgressInit(SmartTemplate, &csTitle,
            theApp.m_hInstance, theApp.m_pMainWnd->m_hWnd);

// Notify others - Primary updated as if new FAS and optionally new data..
lTrace.AddTail(m_pPrimaryTrace);
theApp.m_pTraceList->UpdateAllViews(NULL, NewFASHint, &lTrace);
if (theApp.m_bSTEventFreqDist)
    theApp.m_pTraceList->UpdateAllViews(NULL, NewDataHint, &lTrace);

if (bUserCancel || bErrorInSmartTemplate)
    goto GetUserInputs;

return;
}

//-------------------------------------------------------------
//
// Function: SmartTemplate()
//
```

Fig. 14B-2

```
// Output:    The Primary Trace is made into a Template Trace based
//           on the selected events Frequency Distribution.
//           Optionally, the Primary waveform may be replaced by the
//           Frequency Distribution and a report printed.
//
//           Sets bErrorInSmartTemplate = TRUE if error detected.
//
// Purpose:  Control Smart Splice Template Processing.
//
// Processing: Control Smart Splice Template Processing by doing the following :
//
//  . Loop over selected traces (note that there will be at least 1),
//      setting up the event data points Frequency Distribution:
//      using non-launch, non-end trace events with loss above threshold.
//
//  . Calculate Primary Trace horizontal offset data point.
//
//  . If req'd then replace Primary Trace data beyond 0km with Frequency Distribution.
//
//  . For the Primary Trace - delete all non-launch&end events.
//
//  . Split groups which contains 2 peaks separated by a valley.
//
//  . Set up up to m_nSTNumSplices splice events from the Frequency
//      Groups with a largest data point frequencies above m_nSTMinFrequency.
//
//  . If save Freq Dist in waveform then set last data point=1 since
//      0's may get clipped off.
//
//  . If req'd then print report.
//---------------------------------------------------------------------
static int      nDataPts;              // Number Frequency Dist data points.
static SHORT*   pDataPts;              // Frequency Dist data.
static BYTE*    pbTypeRflGrp;          // Type of event in data : Reflective or Group.
#define TYPE_RFL  1
#define TYPE_GRP  2
static double   dPrimaryEnd;           // In current distance units.
static double   dDx;                   // Primary dx in km.
static int      nDataPtHOff;           // Primary horizontal offset in data points.

static int nSTConsistentTestFlags =
          CONSISTENT_NO_VISIBLE_EVENTS |
          CONSISTENT_QUESTIONABLE_END  |
          CONSISTENT_LENGTH            |
          CONSISTENT_HSHIFT;

//
// The arrays below contains the information in the printed Frequency Distribution.
//---------------------------------------------------------------------
#define MAX_GROUP        100
#define MAX_GROUP_EVENTS 3
static int      nGroup;                          // Number of Frequency Groups.
static int      nPtStart       [MAX_GROUP];
static int      nPtEnd         [MAX_GROUP];
static int      nEventNum      [MAX_GROUP];      // = 0 if no event.
static double   dStart         [MAX_GROUP];      // Start Location.
static double   dWidth         [MAX_GROUP];
static int      nFreq          [MAX_GROUP];
static int      nMinLocEvents  [MAX_GROUP];
static int      nMaxLocEvents  [MAX_GROUP];
static int      nMaxLossEvents [MAX_GROUP];

static CString  csMinLocTrace  [MAX_GROUP][MAX_GROUP_EVENTS];
static double   dMinLocLoc     [MAX_GROUP][MAX_GROUP_EVENTS];
static double   dMinLocWidth   [MAX_GROUP][MAX_GROUP_EVENTS];
static double   dMinLocLoss    [MAX_GROUP][MAX_GROUP_EVENTS];

static CString  csMaxLocTrace  [MAX_GROUP][MAX_GROUP_EVENTS];
static double   dMaxLocLoc     [MAX_GROUP][MAX_GROUP_EVENTS];
static double   dMaxLocWidth   [MAX_GROUP][MAX_GROUP_EVENTS];
static double   dMaxLocLoss    [MAX_GROUP][MAX_GROUP_EVENTS];

static CString  csMaxLossTrace [MAX_GROUP][MAX_GROUP_EVENTS];
static double   dMaxLossLoc    [MAX_GROUP][MAX_GROUP_EVENTS];
static double   dMaxLossWidth  [MAX_GROUP][MAX_GROUP_EVENTS];
static double   dMaxLossLoss   [MAX_GROUP][MAX_GROUP_EVENTS];

//
// The arrays below contains the information in the printed Shortest/longest
// trace ends.
//---------------------------------------------------------------------
#define MAX_SHORT_LONG  10
static int      nShort;
```

*Fig. 14C*

```
// Output:  The Primary Trace is made into a Template Trace based
//          on the selected events Frequency Distribution.
//          Optionally, the Primary waveform may be replaced by the
//          Frequency Distribution and a report printed.
//
//          Sets bErrorInSmartTemplate = TRUE if error detected.
//
// Purpose: Control Smart Splice Template Processing.
//
// Processing: Control Smart Splice Template Processing by doing the following :
//
// . Loop over selected traces (note that there will be at least 1),
//   setting up the event data points Frequency Distribution;
//   using non-launch, non-end trace events with loss above threshold.
//
// . Calculate Primary Trace horizontal offset data point.
//
// . If req'd then replace Primary Trace data beyond 0km with Frequency Distribution.
//
// . For the Primary Trace - delete all non-launch&end events.
//
// . Split groups which contains 2 peaks separated by a valley.
//
// . Set up up to m_nSTNumSplices splice events from the Frequency
//   Groups with a largest data point frequencies above m_nSTMinFrequency.
//
// . If save Freq Dist in waveform then set last data point=1 since
//   0's may get clipped off.
//
// . If req'd then print report.
//---------------------------------------------------------------------
static int    nDataPts;         // Number Frequency Dist data points.
static SHORT* pDataPts;         // Frequency Dist data.
static BYTE*  pbTypeRflGrp;     // Type of event in data : Reflective or Group.
#define TYPE_RFL  1
#define TYPE_GRP  2
static double dPrimaryEnd;      // In current distance units.
static double dDx;              // Primary dx in km.
static int    nDataPtHOff;      // Primary horizontal offset in data points.

static int nSTConsistentTestFlags =
        CONSISTENT_NO_VISIBLE_EVENTS |
        CONSISTENT_QUESTIONABLE_END  |
        CONSISTENT_LENGTH            |
```

Fig. 14C-1

CONSISTENT_HSHIFT;

```
//
// The arrays below contains the information in the printed Frequency Distribution.
//-------------------------------------------------------------------------------
#define MAX_GROUP        100
#define MAX_GROUP_EVENTS 3
static int    nGroup;                     // Number of Frequency Groups.
static int    nPtStart    [MAX_GROUP];
static int    nPtEnd      [MAX_GROUP];
static int    nEventNum   [MAX_GROUP];    // == 0 if no event.
static double dStart      [MAX_GROUP];    // Start Location.
static double dWidth      [MAX_GROUP];
static int    nFreq       [MAX_GROUP];
static int    nMinLocEvents [MAX_GROUP];
static int    nMaxLocEvents [MAX_GROUP];
static int    nMaxLossEvents[MAX_GROUP];

static CString csMinLocTrace[MAX_GROUP][MAX_GROUP_EVENTS];
static double  dMinLocLoc   [MAX_GROUP][MAX_GROUP_EVENTS];
static double  dMinLocWidth [MAX_GROUP][MAX_GROUP_EVENTS];
static double  dMinLocLoss  [MAX_GROUP][MAX_GROUP_EVENTS];

static CString csMaxLocTrace[MAX_GROUP][MAX_GROUP_EVENTS];
static double  dMaxLocLoc   [MAX_GROUP][MAX_GROUP_EVENTS];
static double  dMaxLocWidth [MAX_GROUP][MAX_GROUP_EVENTS];
static double  dMaxLocLoss  [MAX_GROUP][MAX_GROUP_EVENTS];

static CString csMaxLossTrace[MAX_GROUP][MAX_GROUP_EVENTS];
static double  dMaxLossLoc   [MAX_GROUP][MAX_GROUP_EVENTS];
static double  dMaxLossWidth [MAX_GROUP][MAX_GROUP_EVENTS];
static double  dMaxLossLoss  [MAX_GROUP][MAX_GROUP_EVENTS];

//
// The arrays below contains the information in the printed Shortest/longest
// trace ends.
//-------------------------------------------------------------------------
#define MAX_SHORT_LONG 10
static int    nShort;
```

Fig. 14C-2

```
static CString  csShortTrace[MAX_SHORT_LONG];
static double   dShortEnd   [MAX_SHORT_LONG];
static int      nLong;
static CString  csLongTrace[MAX_SHORT_LONG];
static double   dLongEnd    [MAX_SHORT_LONG];

static void SmartTemplate()    // Smart Splice Template Process selected traces.
{
    CString csLine1;
    CString csTraceFilespec;

int    i;
    int    j;
    int    k;
    int    nEventCount;
    int    nTemp;

int    nDataPtStart;
    int    nDataPtEnd;
    int    nDataPtMax;
    int    nLaunchEnd;

int    nLftLSALength;
    int    nRgtLSALength;
    int    nLSAMinPts;
    int    nLSAMaxPts;

int    nPercent = (theApp.m_bSTPrintReport) ? 45 : 100; // Make progress %

BOOL   bReflective;
    BOOL   bGroup;

double dEventStartKm;
    double dEventEndKm;
    double dTraceEnd;           // In current distance units.
    double dRatio;              // For Helix Adjust:primary end/trace end location.

OTDR_TRACE*       pTrc;
    EVENT*            pEvent;
    MASTER_EVENT*     pMasterEvent;
    LossMode          eLossMode;
    POSITION          pos;
    CTrcListElement*  pElement;

bErrorInSmartTemplate = FALSE;              // No error.
    csLine1.LoadString(IDS_CURRENT_TRACE_FILE);

ConsistentInit(nSTConsistentTestFlags, 2.0, 2.0, 2.0);  // Init consistency test.
    ConsistentRef (pPrimary);

nEventCount = pPrimary->GetFASEventCount();
    dPrimaryEnd = 0.0;
    if (nEventCount > 1)
        dPrimaryEnd = pPrimary->GetEventDistance(nEventCount-1);

pDataPts    = (SHORT*) GlobalAlloc(GMEM_FIXED, BUFFER_SIZE*sizeof(WORD));
    pbTypeRflGrp = (BYTE*) GlobalAlloc(GMEM_FIXED, BUFFER_SIZE*sizeof(BYTE));
    memset(pDataPts,   0, BUFFER_SIZE*sizeof(WORD));
    memset(pbTypeRflGrp, 0, BUFFER_SIZE*sizeof(BYTE));
    dDx         = (double) pPrimary->m_traceData.dx;
    nLSAMinPts = (int) (LSA_MIN_KM / dDx);
    nLSAMaxPts = (int) (LSA_MAX_KM / dDx);

// Loop over selected traces (note that there will be at least 1),
    // setting up the event data points Frequency Distribution.
    //----------------------------------------------------------------
    i = 0;
    nTracesUsed = 0;
    pos = pListSelected->GetHeadPosition();
    while (pos != NULL)
    {
        // Process next selected trace with events.
        //----------------------------------------------------------------
        ++i;
        pElement  = pListSelected->GetNext(pos);
        pTraceDoc = pElement->GetDocument(); // Get the trace (may already be in memory)

if (pTraceDoc == NULL)
            continue;

if (pTraceDoc == theApp.GetPrimaryTrace())  // Don't use primary.
            continue;
```

*Fig. 14D*

```
static CString csShortTrace[MAX_SHORT_LONG];
static double  dShortEnd   [MAX_SHORT_LONG];
static int     nLong;
static CString csLongTrace[MAX_SHORT_LONG];
static double  dLongEnd   [MAX_SHORT_LONG];

static void SmartTemplate()    // Smart Splice Template Process selected traces.
{
    CString csLine1;
    CString csTraceFilespec;

int   i;
    int   j;
    int   k;
    int   nEventCount;
    int   nTemp;

int   nDataPtStart;
    int   nDataPtEnd;
    int   nDataPtMax;
    int   nLaunchEnd;

int   nLftLSALength;
    int   nRgtLSALength;
    int   nLSAMinPts;
    int   nLSAMaxPts;

int   nPercent = (theApp.m_bSTPrintReport) ? 45 : 100; // Make progress %

BOOL  bReflective;
    BOOL  bGroup;

double dEventStartKm;
    double dEventEndKm;
    double dTraceEnd;       // In current distance units.
    double dRatio;          // For Helix Adjust:primary end/trace end location.

OTDR_TRACE*    pTrc;
    EVENT*         pEvent;
    MASTER_EVENT*  pMasterEvent;
    LossMode       eLossMode;
    POSITION       pos;
    CTrcListElement* pElement;
```

Fig. 14D-1

```
bErrorInSmartTemplate = FALSE;        // No error.
csLine1.LoadString(IDS_CURRENT_TRACE_FILE);

ConsistentInit(nSTConsistentTestFlags, 2.0, 2.0, 2.0);  // Init consistency test.
ConsistentRef (pPrimary);

nEventCount = pPrimary->GetFASEventCount();
dPrimaryEnd = 0.0;
if (nEventCount > 1)
   dPrimaryEnd = pPrimary->GetEventDistance(nEventCount-1);

pDataPts   = (SHORT*) GlobalAlloc(GMEM_FIXED, BUFFER_SIZE*sizeof(WORD));
pbTypeRflGrp = (BYTE*) GlobalAlloc(GMEM_FIXED, BUFFER_SIZE*sizeof(BYTE));
memset(pDataPts,   0, BUFFER_SIZE*sizeof(WORD));
memset(pbTypeRflGrp, 0, BUFFER_SIZE*sizeof(BYTE));
dDx    = (double) pPrimary->m_traceData.dx;
nLSAMinPts = (int) (LSA_MIN_KM / dDx);
nLSAMaxPts = (int) (LSA_MAX_KM / dDx);

// Loop over selected traces (note that there will be at least 1),
// setting up the event data points Frequency Distribution.
//------------------------------------------------------------
i = 0;
nTracesUsed = 0;
pos = pListSelected->GetHeadPosition();
while (pos != NULL)
{
   // Process next selected trace with events.
   //------------------------------------------
   ++i;
   pElement = pListSelected->GetNext(pos);
   pTraceDoc = pElement->GetDocument();  // Get the trace (may already be in memory)

if (pTraceDoc == NULL)
      continue;

if (pTraceDoc == theApp.GetPrimaryTrace())  // Don't use primary.
      continue;
```

Fig. 14D-2

```
if (!ConsistantTest(pTraceDoc, nSTConsistentTestFlags, j))
    goto FreeAndErrorExit;

++nTracesUsed;

nEventCount = pTraceDoc->GetFASEventCount();
if (nEventCount == 0)
    continue;

dRatio    = 1.0;             // Calc ratio for helix adjustment.
dTraceEnd = pTraceDoc->GetEventDistance(nEventCount-1);
if ( theApp.m_bSTAdjustForHelix
     && (dTraceEnd   > 0.0)
     && (dPrimaryEnd > 0.0))
    dRatio = dPrimaryEnd/dTraceEnd;
//
// Loop over non-launch, non-end trace events with loss above threshold.
//-----------------------------------------------------------------
for (j=1; j<(nEventCount-1); ++j)
{
    dEventStartKm = pTraceDoc->GetAdjustedFASEventDistance(j)
                    / dConvertFactor * dRatio;
    if (dEventStartKm < 0.0)
        continue;
    if ((fabs(pTraceDoc->GetFASEventLoss(j))) < theApp.m_dSTLossThres)
        continue;
    if ((fabs(pTraceDoc->GetFASEventLoss(j))) > 30000.0)  // Loss unknown.
        continue;

bReflective = FALSE;      // Determine if event is reflective or grouped.
    bGroup      = FALSE;
    pEvent = &pTraceDoc->m_traceData.et[j];
    if ( (pTraceDoc->GetFASEventType(j) == REFLECTION  )
         || (pTraceDoc->GetFASEventType(j) == GROUPEDEVENT) )
    {
        if (pEvent->refl != UNKNOWN_LOSS)
        {
            if (((-pEvent->refl/100.0) >= pTraceDoc->GetFASReflectance()))
                bReflective = TRUE;
        }
        if (pTraceDoc->GetFASEventType(j) == GROUPEDEVENT)
            bGroup = TRUE;
    }

// Set up data point start and end indicies.
    dEventEndKm  = pTraceDoc->GetAdjustedFASEventEnd(j)
                   / dConvertFactor * dRatio;
    nDataPtStart = (int) (dEventStartKm/dDx);
    nDataPtEnd   = (int) (dEventEndKm  /dDx);
    nDataPtStart = min(nDataPtStart, BUFFER_SIZE-1);
    nDataPtEnd   = min(nDataPtEnd  , BUFFER_SIZE-1);
    //
    // Increment event's data points in the Frequency Distribution.
    // If event is reflective or grouped then set the type for the data points.
    //-----------------------------------------------------------------
    for (k=nDataPtStart; k<=nDataPtEnd; ++k)
    {
        ++pDataPts[k];
        if (bReflective)
            pbTypeRflGrp[k] |= TYPE_RFL;
        if (bGroup)
            pbTypeRflGrp[k] |= TYPE_GRP;
    }
}   // End of events loop for selected trace.

csTraceFilespec = pTraceDoc->GetPathName();    // Update progress.
pElement->ReleaseDocument();
if (!RunWithProgressPercent((i*nPercent)/nSelected,
                &csLine1, &csTraceFilespec) )
    break;  // Operator cancel.
}   // End of selected traces loop.

if (nTracesUsed < 1)
    nTracesUsed = 1;

// Calculate Primary Trace horizontal offset data point.
//-----------------------------------------------------------------
nDataPtHOff = pPrimary->m_traceData.view_desc.hoffset/0x10000;

//
// If req'd then update Primary Trace data beyond 0km with Frequency Distribution.
//-----------------------------------------------------------------
if (theApp.m_bSTEventFreqDist)
```

*Fig. 14E*

```
    SHORT* pPrimaryData = pPrimary->m_traceData.buffer;

int  nMaxDBCount = ((int) pPrimary->GetDynamicRange()) * DB_DIVIDER;

if (nDataPtHOff <= 0)    // Primary shifted left.
    {
      i = -nDataPtHOff;
      j = 0;
    }
    else                     // Primary shifted right.
    {
      i = 0;
      j = nDataPtHOff;
    }
    while (  (i <= pPrimary->m_traceData.trace_data_end)
         && (j < BUFFER_SIZE) )
       pPrimaryData[i++] = ((int) pDataPts[j++]) * nMaxDBCount / nTracesUsed;
}

//
// For the Primary Trace - delete all non-launch&end events.
//------------------------------------------------------------
pTrc = &(pPrimary->m_traceData);
nEventCount = pPrimary->GetFASEventCount();
memcpy( &(pTrc->et[1]), &(pTrc->et[nEventCount-1]), sizeof(EVENT));
pTrc->et_indx = 2;
pPrimary->SetModifiedFlag();

if (!(pTrc->flags & TF_TEMPLATE))
    FAS_convert_template_events(pTrc);    // PC-3000 function name.
pTrc->flags |= TF_TEMPLATE;

nLaunchEnd = pTrc->et[0].end  / 0x10000 + nDataPtHOff;
nDataPts   = pTrc->et[1].start / 0x10000 + nDataPtHOff;
if (nLaunchEnd < 0)
   nLaunchEnd = 0;
if (nDataPts < 0)
   nDataPts = 0;

//
// The code below attempts to separate a frequency group
// containing 2 sets of events.
// Loop over all Frequency Distribution data points after launch,
```

Fig. 14E-1

```
// Set up data point start and end indicies.
dEventEndKm  = pTraceDoc->GetAdjustedFASEventEnd(j)
        / dConvertFactor * dRatio;
nDataPtStart = (int) (dEventStartKm/dDx);
nDataPtEnd   = (int) (dEventEndKm /dDx);
nDataPtStart = min(nDataPtStart, BUFFER_SIZE-1);
nDataPtEnd   = min(nDataPtEnd  , BUFFER_SIZE-1);
//
// Increment event's data points in the Frequency Distribution.
// If event is reflective or grouped then set the type for the data points.
//------------------------------------------------------------
    for (k=nDataPtStart; k<=nDataPtEnd; ++k)
    {
      ++pDataPts[k];
      if (bReflective)
         pbTypeRflGrp[k] |= TYPE_RFL;
      if (bGroup)
         pbTypeRflGrp[k] |= TYPE_GRP;
    }
  } // End of events loop for selected trace.

csTraceFilespec = pTraceDoc->GetPathName();   // Update progress.
  pElement->ReleaseDocument();
  if (!RunWithProgressPercent((i*nPercent)/nSelected,
        &csLine1, &csTraceFilespec) )
     break; // Operator cancel.
} // End of selected traces loop.

if (nTracesUsed < 1)
   nTracesUsed = 1;

// Calculate Primary Trace horizontal offset data point.
//------------------------------------------------------
nDataPtHOff = pPrimary->m_traceData.view_desc.hoffset/0x10000;

//
// If req'd then update Primary Trace data beyond 0km with Frequency Distribution.
//------------------------------------------------------------
if (theApp.m_bSTEventFreqDist)
```

Fig. 14E-2

```
{
    SHORT* pPrimaryData = pPrimary->m_traceData.buffer;

int    nMaxDBCount  = ((int) pPrimary->GetDynamicRange()) * DB_DIVIDER;

if (nDataPtHOff <= 0)          // Primary shifted left.
    {
        i = -nDataPtHOff;
        j = 0;
    }
    else                           // Primary shifted right.
    {
        i = 0;
        j = nDataPtHOff;
    }
    while (    (i <= pPrimary->m_traceData.trace_data_end)
            && (j < BUFFER_SIZE)  )
        pPrimaryData[i++] = ((int) pDataPts[j++]) * nMaxDBCount / nTracesUsed;
}

//
// For the Primary Trace - delete all non-launchEend events.
//------------------------------------------------------------------
pTrc = &(pPrimary->m_traceData);
nEventCount = pPrimary->GetFASEventCount();
memcpy( &(pTrc->et[1]), &(pTrc->et[nEventCount-1]), sizeof(EVENT));
pTrc->et_indx = 2;
pPrimary->SetModifiedFlag();

if (!(pTrc->flags & TF_TEMPLATE))
    FAS_convert_template_events(pTrc);    // PC-3000 function name.
pTrc->flags |= TF_TEMPLATE;

nLaunchEnd = pTrc->et[0].end   / 0x10000 + nDataPtHOff;
nDataPts   = pTrc->et[1].start / 0x10000 + nDataPtHOff;
if (nLaunchEnd < 0)
    nLaunchEnd = 0;
if (nDataPts < 0)
    nDataPts = 0;

//
// The code below attempts to separate a frequency group
// containing 2 sets of events.
// Loop over all Frequency Distribution data points after launch,
// searching for a frequency group, starting at frequency value Min Frequency,
// with 2 peaks separated by a valley (<= VALLEY_PERCENT % of peak).
// If found then set the valley data point frequency to 0
// to force 2 2-Point events.
//------------------------------------------------------------------
{
define VALLEY_PERCENT 80 int nPeak1Index;
    int nPeak1Value;
    int nValleyIndex;
    int nValleyValue;

for (i=(nLaunchEnd+1); i<nDataPts; ++i)
    {
        if (pDataPts[i] < theApp.m_nSTMinFrequency)
            continue;
        //
        // Have 1st data point of a group with sufficent frequency.
        // Find the first peak and then the frequency down VALLEY_PERCENT.
        //------------------------------------------------------------------
        nPeak1Value = 0;
        for (; i<nDataPts; ++i)
        {
            if (nPeak1Value < pDataPts[i])
            {
                nPeak1Index = i;
                nPeak1Value = pDataPts[i];
            }
            else    // Data pt at or below peak.
            {
                k = nPeak1Value * VALLEY_PERCENT /100;
                if (pDataPts[i] <= k)
                    break;
            }
        }
        //
        // Now try to find the valley then a 2nd peak above the valley
        // (up 100/VALLEY_PERCENT).
```

*Fig. 14F*

```
    SHORT* pPrimaryData = pPrimary->m_traceData.buffer;

in  nMaxDBCount = ((int) pPrimary->GetDynamicRange()) * DB_DIVIDER;

if (nDataPtHOff <= 0)    // Primary shifted left.
    {
      i = -nDataPtHOff;
      j = 0;
    }
    else                     // Primary shifted right.
    {
      i = 0;
      j = nDataPtHOff;
    }
    while (  (i <= pPrimary->m_traceData.trace_data_end)
         && (j < BUFFER_SIZE) )
       pPrimaryData[i++] = ((int) pDataPts[j++]) * nMaxDBCount / nTracesUsed;
}

//
// For the Primary Trace - delete all non-launch&end events.
//------------------------------------------------------------
pTrc = &(pPrimary->m_traceData);
nEventCount = pPrimary->GetFASEventCount();
memcpy( &(pTrc->et[1]), &(pTrc->et[nEventCount-1]), sizeof(EVENT));
pTrc->et_indx = 2;
pPrimary->SetModifiedFlag();

if (!(pTrc->flags & TF_TEMPLATE))
    FAS_convert_template_events(pTrc);    // PC-3000 function name.
pTrc->flags |= TF_TEMPLATE;

nLaunchEnd = pTrc->et[0].end   / 0x10000 + nDataPtHOff;
nDataPts   = pTrc->et[1].start / 0x10000 + nDataPtHOff;
if (nLaunchEnd < 0)
    nLaunchEnd = 0;
if (nDataPts < 0)
    nDataPts = 0;

//
// The code below attempts to separate a frequency group
// containing 2 sets of events.
// Loop over all Frequency Distribution data points after launch,
```

Fig. 14F-1

```
// searching for a frequency group, starting at frequency value Min Frequency,
// with 2 peaks separated by a valley (<= VALLEY_PERCENT % of peak).
// If found then set the valley data point frequency to 0
// to force 2 2-Point events.
//-----------------------------------------------------------------------
{
define VALLEY_PERCENT 80 int nPeak1Index;
    int nPeak1Value;
    int nValleyIndex;
    int nValleyValue;

for (i=(nLaunchEnd+1); i<nDataPts; ++i)
    {
        if (pDataPts[i] < theApp.m_nSTMinFrequency)
            continue;
        //
        // Have 1st data point of a group with sufficent frequency.
        // Find the first peak and then the frequency down VALLEY_PERCENT.
        //-----------------------------------------------------------------
        nPeak1Value = 0;
        for (; i<nDataPts; ++i)
        {
            if (nPeak1Value < pDataPts[i])
            {
                nPeak1Index = i;
                nPeak1Value = pDataPts[i];
            }
            else   // Data pt at or below peak.
            {
                k = nPeak1Value * VALLEY_PERCENT /100;
                if (pDataPts[i] <= k)
                    break;
            }
        }
        //
        // Now try to find the valley then a 2nd peak above the valley
        // (up 100/VALLEY_PERCENT).
```

Fig. 14F-2

```
// If a second peak is found
// then set frequency of valley to 0 to force into 2 groups.
//-----------------------------------------------------------
nValleyIndex = i;
nValleyValue = pDataPts[i];
for (; i<nDataPts; ++i)
{
    if (pDataPts[i] <= 0)
        break;
    if (nValleyValue >= pDataPts[i])
    {
        nValleyIndex = i;
        nValleyValue = pDataPts[i];
    }
    else
    {
        k = nValleyValue * 100 / VALLEY_PERCENT;
        if (k <= pDataPts[i])
        {
            pDataPts[nValleyIndex-1] = 0;
            pDataPts[nValleyIndex  ] = 0;
            for (; i<nDataPts; ++i)
            {
                if (pDataPts[i] <= 0)
                    break;
            }
        }
    }
}

//
// Set up up to m_nSTNumSplices splice events from the Frequency
// Groups with a largest data point frequencies above m_nSTMinFrequency.
//----------------------------------------------------------------------
for (i=0; i<theApp.m_nSTNumSplices; ++i)
{
    // Find max frequency left.
    //-------------------------
    nDataPtStart = -1;
    nDataPtMax   = 0;
    for (j=(nLaunchEnd+1); j<nDataPts; ++j)
    {
        if (nDataPtMax < pDataPts[j])
        {
            nDataPtMax   = pDataPts[j];
            nDataPtStart = j;
        }
    }
    if (nDataPtMax < theApp.m_nSTMinFrequency)  // If none then done-no more events.
        break;

// Find the group start data point.
    //---------------------------------
    nDataPtEnd = nDataPtStart;
    while (--nDataPtStart > nLaunchEnd)
    {
        if (pDataPts[nDataPtStart] <= 0)
        {
            ++nDataPtStart;
            break;
        }
    }

// Find the group end data point.
    //-------------------------------
    nDataPtStart = max(nDataPtStart, (nLaunchEnd+1));
    while (++nDataPtEnd < nDataPts)
    {
        if (pDataPts[nDataPtEnd] <= 0)
        {
            --nDataPtEnd;
            break;
        }
    }

// Find (end+1) of prior group with frequency m_nSTMinFrequency.
    // Set nLftLSALength to the interval between this and prior group.
    //----------------------------------------------------------------
    nDataPtEnd = min(nDataPtEnd, nDataPts-1);
    nLftLSALength = 0;
```

*Fig. 14G*

```
// If a second peak is found
// then set frequency of valley to 0 to force into 2 groups.
//--------------------------------------------------------------
nValleyIndex = i;
nValleyValue = pDataPts[i];
for (; i<nDataPts; ++i)
{
  if (pDataPts[i] <= 0)
    break;
  if (nValleyValue >= pDataPts[i])
  {
    nValleyIndex = i;
    nValleyValue = pDataPts[i];
  }
  else
  {
    k = nValleyValue * 100 / VALLEY_PERCENT;
    if (k <= pDataPts[i])
    {
      pDataPts[nValleyIndex-1] = 0;
      pDataPts[nValleyIndex  ] = 0;
      for (; i<nDataPts; ++i)
      {
        if (pDataPts[i] <= 0)
          break;
      }
    }
  }
}
}

//
// Set up up to m_nSTNumSplices splice events from the Frequency
// Groups with a largest data point frequencies above m_nSTMinFrequency.
//-------------------------------------------------------------------------- for (i=0; i<theApp.m_nSTNumSplices; ++i)
{
  // Find max frequency left.
  //-------------------------
  nDataPtStart = -1;
  nDataPtMax   = 0;
  for (j=(nLaunchEnd+1); j<nDataPts; ++j)
```

Fig. 14G-1

```
    {
      if (nDataPtMax < pDataPts[j])
      {
        nDataPtMax  = pDataPts[j];
        nDataPtStart = j;
      }
    }
    if (nDataPtMax < theApp.m_nSTMinFrequency)  // If none then done-no more events.
      break;

// Find the group start data point.
    //---------------------------------
    nDataPtEnd = nDataPtStart;
    while (--nDataPtStart > nLaunchEnd)
    {
      if (pDataPts[nDataPtStart] <= 0)
      {
        ++nDataPtStart;
        break;
      }
    }

// Find the group end data point.
    //---------------------------------
    nDataPtStart = max(nDataPtStart, (nLaunchEnd+1));
    while (++nDataPtEnd < nDataPts)
    {
      if (pDataPts[nDataPtEnd] <= 0)
      {
        --nDataPtEnd;
        break;
      }
    }

// Find (end+1) of prior group with frequency m_nSTMinFrequency.
    // Set nLftLSALength to the interval between this and prior group.
    //---------------------------------------------------------------
    nDataPtEnd = min(nDataPtEnd, nDataPts-1);
    nLftLSALength = 0;
```

Fig. 14G-2

```
for (j=(nDataPtStart-1); j>nLaunchEnd; --j)
{
    if (pDataPts[j] == 0)
        nLftLSALength = nDataPtStart - j;
    else if (abs(pDataPts[j]) >= theApp.m_nSTMinFrequency)
        break;
}

// Find (start-1) of next group with frequency m_nSTMinFrequency.
// Set nRgtLSALength to the interval between this and next group.
//-------------------------------------------------------------
nRgtLSALength = 0;
for (j=(nDataPtEnd+1); j<nDataPts; ++j)
{
    if (pDataPts[j] == 0)
        nRgtLSALength = j - nDataPtEnd;
    else if (abs(pDataPts[j]) >= theApp.m_nSTMinFrequency)
        break;
}

// Set up the event.
//----------------------
pEvent = &pTrc->et[pTrc->et_indx];
memset(pEvent, 0, sizeof(EVENT));

pEvent->start = (nDataPtStart - nDataPtROff) * 0x10000;
pEvent->end   = (nDataPtEnd   - nDataPtROff) * 0x10000;
pEvent->losb  = DP(pEvent->end);
pEvent->type  = NONREFLECTIVE;
//
// If  any group data points
//     then flag event as grouped.
// If  any reflective data points
//     then set reflection = -50.00
//         and if non-grouped then flag as reflective.
//----------------------------------------------------------
for (j=nDataPtStart; j<nDataPtEnd; ++j)
{
    if (pbTypeRflGrp[j] & TYPE_GRP)
        pEvent->type = GROUPEDEVENT;
    if (pbTypeRflGrp[j] & TYPE_RFL)
    {
        pEvent->refl = 5000;
        if (pEvent->type != GROUPEDEVENT)
            pEvent->type = REFLECTION;
    }
}
pEvent->flag = USER_CREATED;
pEvent->loss = (SHORT) ((double) nDataPtMax
                / (double) (nTracesUsed*5) / pTrc->dy);

if (  (nLftLSALength >= nLSAMinPts)       // Set event loss mode.
   && (nRgtLSALength >= nLSAMinPts) )
    eLossMode = SpliceLoss;
else
    eLossMode = TwoPtLoss;

if (nLftLSALength > nLSAMaxPts)
    nLftLSALength = nLSAMaxPts;
if (nRgtLSALength > nLSAMaxPts)
    nRgtLSALength = nLSAMaxPts;

pPrimary->SetFASEventLossMode(pTrc->et_indx, eLossMode, TRUE);

if (eLossMode == SpliceLoss)    //Splice Loss
{
    //
    // FAS sometimes puts the event start before the splice (up to 600 m).
    // If more than a max frequency of 2 then
    //     adjust the event start higher,
    //     leaving the end and LSA Cursors at the same absolute location.
    //----------------------------------------------------------------
    nTemp = 0;
    if (nDataPtMax > 2)
    {
        nTemp = nDataPtMax/2;
        k     = (nDataPtStart+nDataPtEnd)/2;
        for (j=nDataPtStart; j<k; ++j)
        {
            if (pDataPts[j] > nTemp)
                break;
        }
        nTemp = (j - nDataPtStart) * 0x10000;
```

*Fig. 14H*

```
for (j=(nDataPtStart-1); j>nLaunchEnd; --j)

{  if (pDataPts[j] == 0)
      nLftLSALength = nDataPtStart - j;
   else if (abs(pDataPts[j]) >= theApp.m_nSTMinFrequency)
      break;
}

// Find (start-1) of next group with frequency m_nSTMinFrequency.
// Set nRgtLSALength to the interval between this and next group.
//-----------------------------------------------------------
nRgtLSALength = 0;
for (j=(nDataPtEnd+1); j<nDataPts; ++j)
{
   if (pDataPts[j] == 0)
      nRgtLSALength = j - nDataPtEnd;
   else if (abs(pDataPts[j]) >= theApp.m_nSTMinFrequency)
      break;
}

// Set up the event.
//-----------------------
pEvent = &pTrc->et[pTrc->et_indx];
memset(pEvent, 0, sizeof(EVENT));

pEvent->start = (nDataPtStart - nDataPtHOff) * 0x10000;
pEvent->end   = (nDataPtEnd   - nDataPtHOff) * 0x10000;
pEvent->losb  = DP(pEvent->end);
pEvent->type  = NONREFLECTIVE;
//
// If  any group data points
// then flag event as grouped.
// If  any reflective data points
// then set reflection = -50.00
//     and if non-grouped then flag as reflective.
//---------------------------------------------------------
for (j=nDataPtStart; j<nDataPtEnd; ++j)
{
   if (pbTypeRflGrp[j] & TYPE_GRP)
      pEvent->type = GROUPEDEVENT;
   if (pbTypeRflGrp[j] & TYPE_RFL)
   {
      pEvent->refl = 5000;
      if (pEvent->type != GROUPEDEVENT)
```

Fig. 14H-1

```
            pEvent->type = REFLECTION;
        }
    }
    pEvent->flag = USER_CREATED;
    pEvent->loss = (SHORT) (((double) nDataPtMax
                 / (double) (nTracesUsed*5) / pTrc->dy);

if ( (nLftLSALength >= nLSAMinPts)   // Set event loss mode.
       && (nRgtLSALength >= nLSAMinPts) )
        eLossMode = SpliceLoss;
    else
        eLossMode = TwoPtLoss;

if (nLftLSALength > nLSAMaxPts)
        nLftLSALength = nLSAMaxPts;
    if (nRgtLSALength > nLSAMaxPts)
        nRgtLSALength = nLSAMaxPts;

pPrimary->SetFASEventLossMode(pTrc->et_indx, eLossMode, TRUE);

if (eLossMode == SpliceLoss)   //Splice Loss
    {
        //
        // FAS sometimes puts the event start before the splice (up to 600 m).
        // If more than a max frequency of 2 then
        // adjust the event start higher,
        // leaving the end and LSA Cursors at the same absolute location.
        //------------------------------------------------------------
        nTemp = 0;
        if (nDataPtMax > 2)
        {
            nTemp = nDataPtMax/2;
            k    = (nDataPtStart+nDataPtEnd)/2;
            for (j=nDataPtStart; j<k; ++j)
            {
                if (pDataPts[j] > nTemp)
                    break;
            }
            nTemp = (j - nDataPtStart) * 0x10000;
```

Fig. 14H-2

```
        }
        pMasterEvent = (MASTER_EVENT*) &pEvent->left;
        pMasterEvent->fc_start
            = -((int) ((LSA_MIDL_PCT+LSA_LAST_PCT) * nLftLSALength * 0x10000)) - nTemp;
        pMasterEvent->fc_length
            = (int) (LSA_MIDL_PCT * nLftLSALength * 0x10000);

pMasterEvent = (MASTER_EVENT*) &pEvent->right;
        pMasterEvent->fc_start = pEvent->end - pEvent->start
            + ((int) (LSA_FRST_PCT * nRgtLSALength * 0x10000)) - nTemp;
        pMasterEvent->fc_length
            = (int) (LSA_MIDL_PCT * nRgtLSALength * 0x10000);

pEvent->start += nTemp;
    }
    else    //  2 Point Loss - slightly ffset start and end.
    {
        nTemp = min(nLftLSALength, nRgtLSALength);
        pEvent->start -= (int) (nTemp * LSA_LAST_PCT * 0x10000);
        pEvent->end   += (int) (nTemp * LSA_FRST_PCT * 0x10000);
    }
    pMasterEvent = (MASTER_EVENT*) &pEvent->left;
    pMasterEvent->cursor = pEvent->start;
    pMasterEvent = (MASTER_EVENT*) &pEvent->right;
    pMasterEvent->cursor = pEvent->end;

++pTrc->et_indx;
    FASDLL_et_sort(pTrc, MAX_EVENT);

// Negate frequency so don't use this group a second.
    //------------------------------------------------
    for (j=nDataPtStart; j<=nDataPtEnd; ++j)
        pDataPts[j] = -pDataPts[j];
}

// If save Freq Dist in waveform then set last data point=1 since
//    0's may get clipped off.
if (theApp.m_bSTEventFreqDist)
    pPrimary->m_traceData.buffer[pPrimary->m_traceData.trace_data_end] = 1;

if (!theApp.m_bSTPrintReport)
    goto Exit;

for (j=0; j<nDataPts; ++j)       // Remove frequency negation.
    pDataPts[j] = abs(pDataPts[j]);

SetupInfo ();      // Set up information for the report.
PrintReport();     // Print the report.

Exit:
    GlobalFree(pDataPts   );
    GlobalFree(pbTypeRflGrp);
    //
    // Free up static CString memory.
    //--------------------------------
    for (i=0; i<MAX_GROUP; ++i)
    {
        for (j=0; j<MAX_GROUP_EVENTS; ++j)
        {
            csMinLocTrace [i][j].Empty();
            csMaxLocTrace [i][j].Empty();
            csMaxLossTrace[i][j].Empty();
        }
    }
    for (i=0; i<MAX_SHORT_LONG; ++i)
    {
        csShortTrace[i].Empty();
        csLongTrace [i].Empty();
    }
    return;

FreeAndErrorExit:
    pElement->ReleaseDocument();        // Free the trace.
    bErrorInSmartTemplate = TRUE;
    goto Exit;
}

//------------------------------------------------------------------------
//
// Function: SetupInfo()
```

*Fig. 141*

```
    }
        pMasterEvent = (MASTER_EVENT*) &pEvent->left;
        pMasterEvent->fc_start
          = -((int) ((LSA_MIDL_PCT+LSA_LAST_PCT) * nLftLSALength * 0x10000)) - nTemp;
        pMasterEvent->fc_length
            = (int) (LSA_MIDL_PCT * nLftLSALength * 0x10000);

pMasterEvent = (MASTER_EVENT*) &pEvent->right;
        pMasterEvent->fc_start  = pEvent->end - pEvent->start
          + ((int) (LSA_FRST_PCT * nRgtLSALength * 0x10000)) - nTemp;
        pMasterEvent->fc_length
            = (int) (LSA_MIDL_PCT * nRgtLSALength * 0x10000);

pEvent->start += nTemp;
    }
    else   // 2 Point Loss - slightly ffset start and end.
    {
      nTemp = min(nLftLSALength, nRgtLSALength);
      pEvent->start -= (int) (nTemp * LSA_LAST_PCT * 0x10000);
      pEvent->end   += (int) (nTemp * LSA_FRST_PCT * 0x10000);
    }
    pMasterEvent = (MASTER_EVENT*) &pEvent->left;
    pMasterEvent->cursor = pEvent->start;
    pMasterEvent = (MASTER_EVENT*) &pEvent->right;
    pMasterEvent->cursor = pEvent->end;

++pTrc->et_indx;
    FASDLL_et_sort(pTrc, MAX_EVENT);

// Negate frequency so don't use this group a second.
    //------------------------------------------------------
    for (j=nDataPtStart; j<=nDataPtEnd; ++j)
       pDataPts[j] = -pDataPts[j];
}

// If save Freq Dist in waveform then set last data point=1 since
//   0's may get clipped off.
if (theApp.m_bSTEventFreqDist)
   pPrimary->m_traceData.buffer[pPrimary->m_traceData.trace_data_end] = 1;

if (!theApp.m_bSTPrintReport)
   goto Exit;
```

Fig. 14I-1

```
      for (j=0; j<nDataPts; ++j)    // Remove frequency negation.
         pDataPts[j] = abs(pDataPts[j]);

SetupInfo ();    // Set up information for the report.
      PrintReport();   // Print the report.

Exit:
   GlobalFree(pDataPts  );
   GlobalFree(pbTypeRflGrp);
   //
   // Free up static CString memory.
   //------------------------------
   for (i=0; i<MAX_GROUP; ++i)
   {
      for (j=0; j<MAX_GROUP_EVENTS; ++j)
      {
         csMinLocTrace [i][j].Empty();
         csMaxLocTrace [i][j].Empty();
         csMaxLossTrace[i][j].Empty();
      }
   }
   for (i=0; i<MAX_SHORT_LONG; ++i)
   {
      csShortTrace[i].Empty();
      csLongTrace [i].Empty();
   }
   return;

FreeAndErrorExit:
   pElement->ReleaseDocument();    // Free the trace.
   bErrorInSmartTemplate = TRUE;
   goto Exit;
}
```

Fig. 14I-2

METHOD OF DETERMINING THE LOCATION OF SPLICES AND OF CALCULATING POWER LOSS AT SPLICES IN OPTIC FIBERS IN A CABLE

BACKGROUND OF THE INVENTION

The present invention relates generally to fiber optic communications where an electrical signal is converted to a light signal, which is transmitted through a fiber to a distant receiver, where it is converted back into the original electrical signal. Such communications systems have many advantages. A signal can be sent to relatively long distances without being amplified; there are no interference problems from nearby electrical fields; a relatively large number of electrical signals can be concurrently transmitted; and the fiber is relatively light and small.

One of the problems with fiber optic communications systems is that the light signal fades or loses power, in other words, becomes attenuated, as it travels along the fiber. Light is attenuated by being absorbed into the fiber, by leaking out of the fiber (due to imperfections or due to excessive bending of the fiber), by being scattered due to Rayleigh scattering, and by being reflected due to Fresnel reflection (which occurs when there is a sudden change in the density of the material through which the light is traveling, such as occurs at the ends of the fibers, and at fiber breaks).

It is important to know how much attenuation occurs in a length of fiber before the fiber is used in a communications system, and also, it is important to determine whether excessive power loss occurs once the fiber has been placed in a communications system. Such excessive power loss may be due to excessive bending of the fiber, due to fiber damage caused by excavators, hammers, and the like, and due to imperfect coupling or splicing of fiber ends.

Once the fiber is used in a communications system, it is important to assess the magnitude of any attenuation through the entire length of the fiber, and also to detect where any excessive power loss is occurring so that remedial action may be taken. Also, many job specifications require that in order for a contractor to be paid for placing the fiber optic communications system, the power loss at any splice must not exceed a certain magnitude.

A widely used method of determining light attenuation in a fiber utilizes an optical time domain reflectometer ("OTDR"). In general, an OTDR sends one or more pulses of laser light through the optic fiber. Each pulse has a predetermined width or time duration, and the interval between pulses is also predetermined. The pulse of laser light traveling through the fiber is somewhat akin to a flashlight being shined into fog (which creates a backscatter of light) or shined through a window (which causes a reflection of some light). The OTDR measures the amount of light being sent backward through the fiber as being representative of the amount of light attenuated. Although the OTDR measures only the amount of light being sent back through the fiber, and not the amount of light being transmitted through the fiber, there is a very close correlation between the two amounts.

The OTDR includes a very precise photodetector that measures the power level of light coming back through the fiber. The OTDR also includes a very precise and sensitive clock that knows when the laser pulse is fired into the optic fiber and when light is sensed by the photodetector. Since light travels in a vacuum faster than it travels in matter (the ratio between the two being called the index of refraction of the matter) and since the index refraction of the fiber is generally known, the OTDR may calculate the distance along the length of fiber where light has been attenuated and the magnitude of that attenuation.

The OTDR may be coupled with a controller to create a graph of light signal level (on the Y axis) and distance along the optic fiber (on the X axis) and to plot a series of data points based upon a sampling of the photodetector and the clock. The series of points may be connected together in what is known as a trace.

The accuracy of the signal level trace is dependent upon the accuracy of the photodetector as well as the correlation between the amount of light traveling back through the fiber as compared with the amount of light transmitted through the fiber. The accuracy of the distance of the feature in the fiber causing the signal loss from the end of the fiber into which the laser is fired is dependent upon the pulse width, the precision of the clock, and the accuracy of the index of refraction (throughout the length of the fiber) and to some degree is dependent upon the spacing of the data points that are used to form the trace.

Normally, the wavelength of the laser light in the OTDR is the same as the wavelength of light to be transmitted for communications purposes through the fiber. Also, the fiber is normally tested by sending a laser pulse down each end of the fiber in what is known as a bi-directional test.

FIG. 1 shows an exemplary trace utilizing an OTDR. The relatively gently, linearly sloped regions indicate attenuation due to backscatter, whereas the more pronounced sloped regions of the trace indicate so-called "events" which cause more severe power loss, as best shown in FIG. 2. Note that events caused by certain phenomena (e.g., a splice) possess a characteristic, unique signature or waveform indicative of the type of phenomena. These events are of special importance because they suggest some irregularity in the fiber that might need correction or remedy. For example, a poor splice of fiber ends (usually through either melting the ends together in a fusion or through a mechanical connector) might require that the splice be remedied. Also, cracking of the fiber that might have been caused by an excavator inadvertently pressing against the fiber, might require corrective action. Consequently, it is important to locate where events happen within the fiber and to determine the magnitude of power loss at each event so that the problem may be remedied efficiently. For example, the location might be at a manhole, at a pedestal, on a particular pole, or at a construction site.

Although an event happens at a particular point or within an extremely short range of distance within a fiber (such as where a fiber end is spliced to the end of a different fiber), the trace will show that the power loss occurs over a short distance as best shown in FIGS. 1–3. For example, the OTDR trace of a fiber might indicate that the event of a splice starts at 10.0 kilometers and ends at 10.1 kilometers from the fiber end through which the laser is fired, where in actuality, the splice is 10.005 kilometers from such end. Thus, an event on a trace is said to have "extent". Such extent is caused by the width of the laser pulse as well as the natural intervals caused by data point sampling of the return light. Each event is also deemed to have a "start" and an "end", in accordance with conventional standards, for example, as indicated by the two vertical dashed lines in FIG. 3. Also, not every relatively sudden attenuation is deemed to be an "event". Various conventional parameters determine whether a power loss has characteristics sufficient to deem the power loss an "event".

Most fiber optic cables include a plurality of optic fibers, with cable being currently commercially available with up to 432 such fibers in what is known as "432 count" cable. Each fiber within the cable is coded and is typically tested for light attenuation using an OTDR in the manner described above.

In addition to the imperfections of distance accuracy previously mentioned, the problem of locating an event is further compounded because a fiber optic cable may possess many strands of fiber helically wrapped around a central supporting core such that the length of the outer fibers is longer than the length of the inner fibers over the distance of the cable. When considering the different lengths of fiber wrapped in a cable, the same event may be located at different distances from the fiber ends. For example, if there is a splice of fibers at a particular manhole, the OTDR trace might show that the event happens at a location starting at 10.0 kilometers and ending at 10.1 kilometers in fiber A, but the event starts at 10.007 and ends at 10.111 in fiber B, which is wrapped further outwardly in the same cable. From simply reading the trace of each fiber, it is difficult to determine whether the same event is causing the power loss at a different distance in each fiber. A conventional method of adjusting the distance of an event along a fiber is to determine the distance of the last or so-called "end" event for each fiber, which by assumption is the termination or end of the fiber, as shown in FIG. 2. Since each of the fibers ends at the same location along the length of the cable, differences in the distance of the end event in each fiber grouped in a cable are representative of the differences in the lengths of each fiber. An assumption can further be made that the percentage of difference in the lengths of the fibers can be extrapolated along the entire length of the cable to adjust relative distances of events occurring in each fiber. For example, if the end event in fiber A is deemed to start at 50.00 kilometers, and the end event fiber B is deemed to start at 51.00 kilometers, then the distances of all of the events in fiber B will be shortened by 2% relative to the events in fiber A. Such a distance adjustment is made for each of the fibers in a cable. It is noteworthy that some optic fibers are placed in parallel (without any helical wrapping) in so-called ribbon cable. Although the same adjustment method may be utilized with ribbon cable, typically no significant adjustment will need to be made.

For certain events, such as a splice, power loss is conventionally calculated in either of two methods. As shown in FIG. 3, a so-called "2 point attenuation correction" method simply calculates the difference of the signal level between the backscatter at the start of the event and at the end of the event and subtract normal fiber attenuation. The so-called "LSA" or least squares analysis calculates a linear slope of the signal level due to backscatter both before (i.e., upstream) and after (i.e., downstream) of the event and extrapolates each slope to the start of the event. The slope is determined at a selected range of distance before and after the event using so-called "cursors". The difference between the extrapolated signal level prior to the start of the event and the extrapolated signal level after the event is another measure of power loss caused by the event, as also shown in FIG. 3.

Typically, the LSA method calculates a more accurate amount of power loss caused by an event, and typically using more data points results in a better estimate. However, where two events are close together, it will be impossible to accurately use an LSA cursor, and in such situations the two point attenuation corrected method is used.

Manual techniques have been used to create a template that designates a start point for the event, and for placing LSA cursors before and after the event, and where the cursors cannot be used, selecting the start and end points for the event so that the two-point attenuation corrected method may be used. In the example shown in FIG. 5, there are traces for five fibers, A, B, C, D, and E. These five fibers might be part of a 432 count cable. In reviewing the five traces, a technician might conclude that there is a splice at a distance generally designated as region 1, since each of the traces shows a splice type event generally in that region. The technician might or might not conclude that there is a splice at the distance generally designated as region 2, since two out of the five fibers show a splice type event generally at that distance. The technician might review traces of additional fibers in an attempt to better evaluate whether a relatively high percentage of traces show a splice type event occurring in region 2. Obviously, it would be extremely laborious to review traces of all 432 fibers. Likewise, a technician might or might not believe that a splice occurs at a distance generally designated as region 3 in FIG. 5, and might further review traces of other fibers to make an evaluation. The technician would probably conclude that there is no splice at a distance generally designated by region 4 in FIG. 5, since none of the five traces shows an event occurring. Such a conclusion might be erroneous in that even though the five exemplary or sample traces do not show an event in region 4, it is possible that perhaps seventy-five traces of other fibers do show an event in region 4. It should be appreciated that there is some estimation and guess-work as to whether the sample or exemplary traces indicate that a splice exists within a region along an optic fiber cable. It would be very laborious to evaluate all fibers, and also there is usually no uniform standard as to how many or what percent of traces must show an event within a particular region in order to conclude that the region includes a splice.

A further problem in existing methodology is that once a region is deemed to include a splice and the calculation must be made as to the power loss experienced by each fiber in the region of the splice, there is some uncertainty as to where the start point should be designated, where the LSA cursors should be placed (in an LSA method) and where the start and end points should be designated (in a two-point attenuation corrected method). Consequently, the start point is often selected by simply "eyeballing" the sampling of the events in a region and, by using experience and discretion, selecting appropriate LSA cursor locations and end points. Such an "eyeball" methodology injects non-uniformity in connection with power loss calculations, not only from technician to technician, but also by the same technician. It should also be appreciated that the training of technicians to interpret the traces and to select a template is extensive and that the existing process is laborious. Often a technician spends two to four hours preparing a template over a single cable. The process is also fraught with potential for innocent and negligent errors, as well as reckless and intentional mistakes.

The present invention provides a substantially uniform methodology for locating splices in optic fiber cable and also for setting up a splice template for calculating the power loss at splices in optic fibers in a cable, in an automated manner.

SUMMARY OF THE INVENTION

The present invention relates to a method of determining the location of splices and of calculating event start and end locations, the type of loss estimate, and LSA cursors locations and lengths, which will be used to calculate the power loss at splices in optic fibers in a cable.

BRIEF DESCRIPTION OF THE DRAWING

The preferred embodiment of the invention will be described with reference to the accompanying drawings, wherein:

FIG. 10 is a report of frequency groups and events in a plurality of optic fibers in a cable that may be generated utilizing the computer program;

FIG. 11 is another, prior art report of calculated power loss at splice locations in a plurality of optic fibers in a cable that may be operated utilizing the computer program;

FIGS. 14 A–I is the source code for a computer program that may be utilized to implement a preferred embodiment of the present invention.

DESCRIPTION OF A PREFERRED EMBODIMENT

The following description of a preferred embodiment is for the purpose of explanation, and not limitation. Some specific details are set forth in order to provide a better understanding of a preferred embodiment of the present invention, however, in other instances, description of other elements, features, and techniques are omitted so as not to encumber or confuse the reader with unnecessary detail. It will be apparent to one skilled in the art that the present invention may be practiced in other embodiments that depart from the following description and that differences may exist from the embodiment specifically described without departing from the spirit and scope of the present invention. The following detailed description is therefore not to be taken in a limiting sense.

Figure 3:
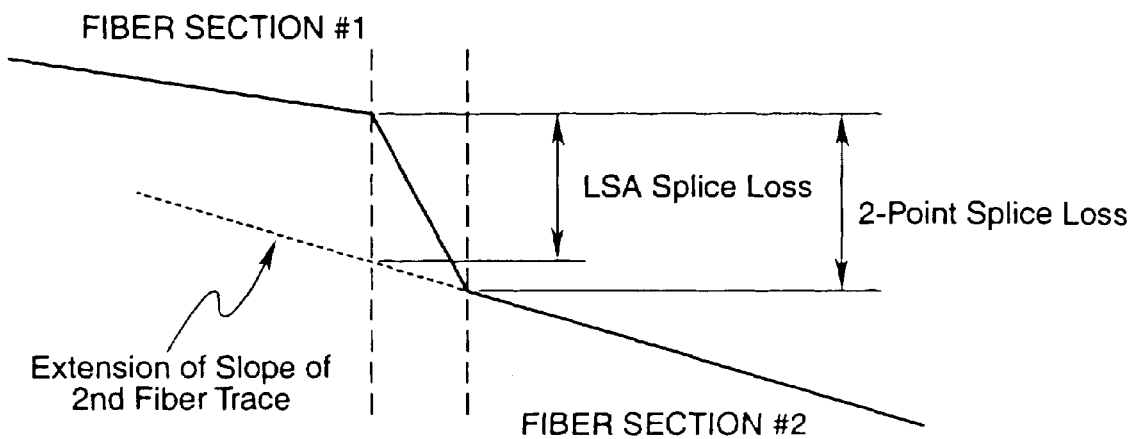
FIG. 3 is a prior art graph depicting two different prior art methods of calculating a signal loss during an event.

In accordance with a preferred embodiment of the present invention, a signal loss trace is created using an OTDR for each of a plurality of optic fibers grouped in a cable. Preferably, the trace is created only in a single, same direction for each of the fibers, although it is contemplated within the scope of the invention that bi-directional traces may also be utilized. As shown in FIG. 3, using conventional methodology, the "location" of the start of an event, such as the event shown in FIG. 3, is determined to be the distance at which the left-most vertical-line is located. The event may be, for example, the place where the optic fibers in one section of cable are spliced together with the optic fibers in a second section. As previously mentioned, the attenuation must have certain prescribed characteristics before it will be deemed an event.

Figure 4:
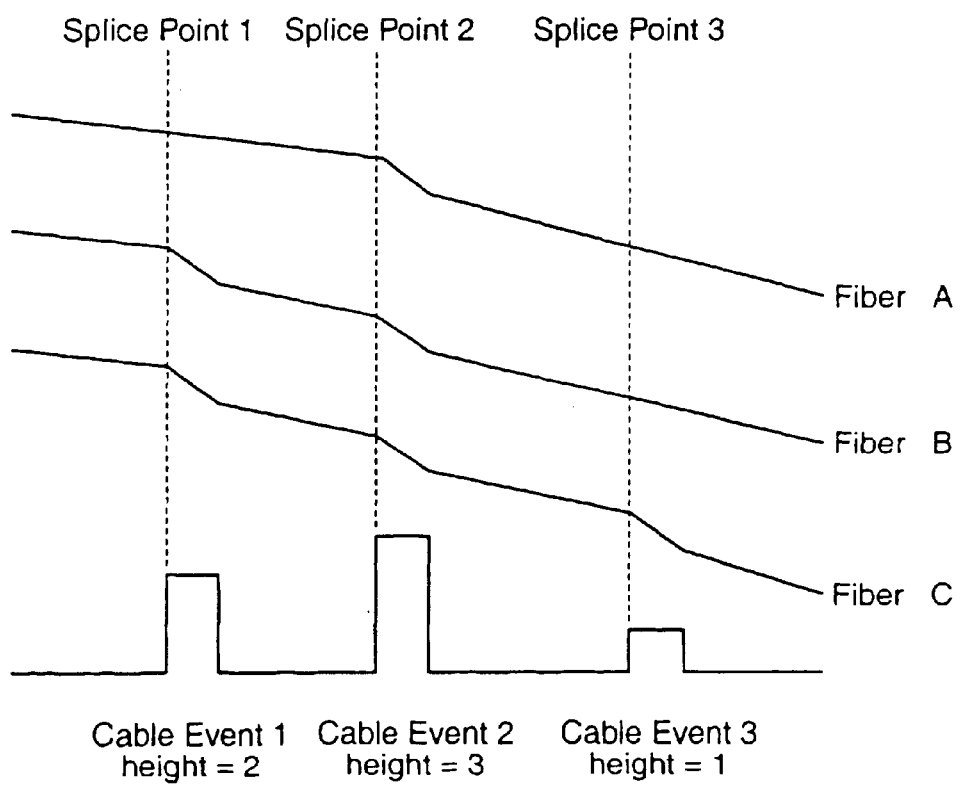
FIG. 4 is a schematic illustration of three exemplary traces of fibers showing three different cable events.
Figure 5:
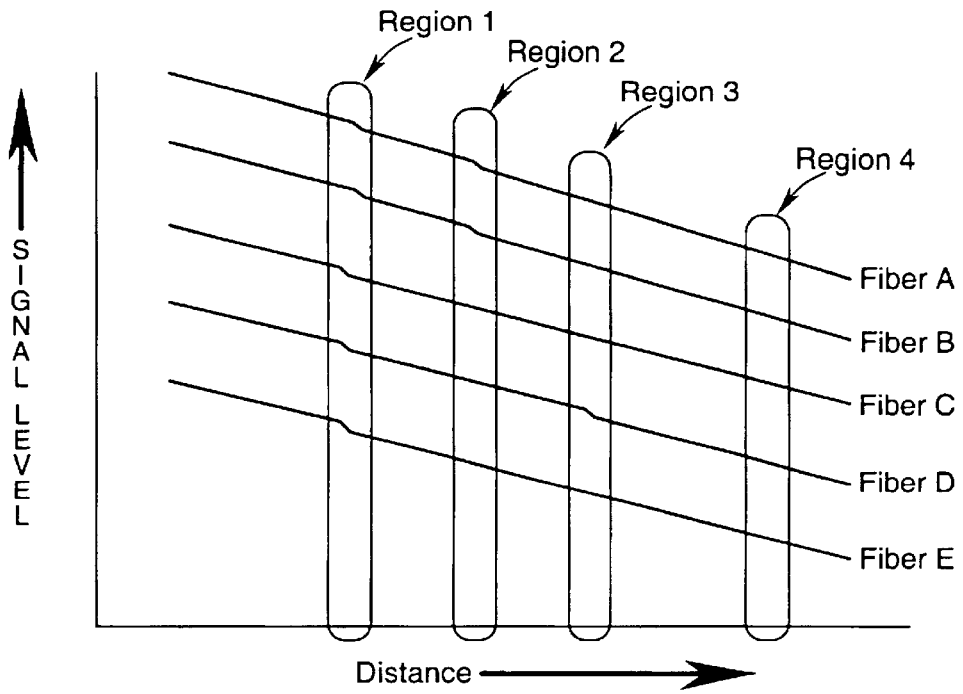
FIG. 5 is a schematic illustration of traces of signal loss in five optic fibers in a cable.

As best shown in FIG. 4, the trace of fiber A shows only one event occurring at a splice point 2, fiber B shows two events occurring at splice point 1 and splice point 2, and fiber C shows three events occurring at splice points 1, 2, and 3. Each of these events has extent when analyzed in detail.

Figure 6:
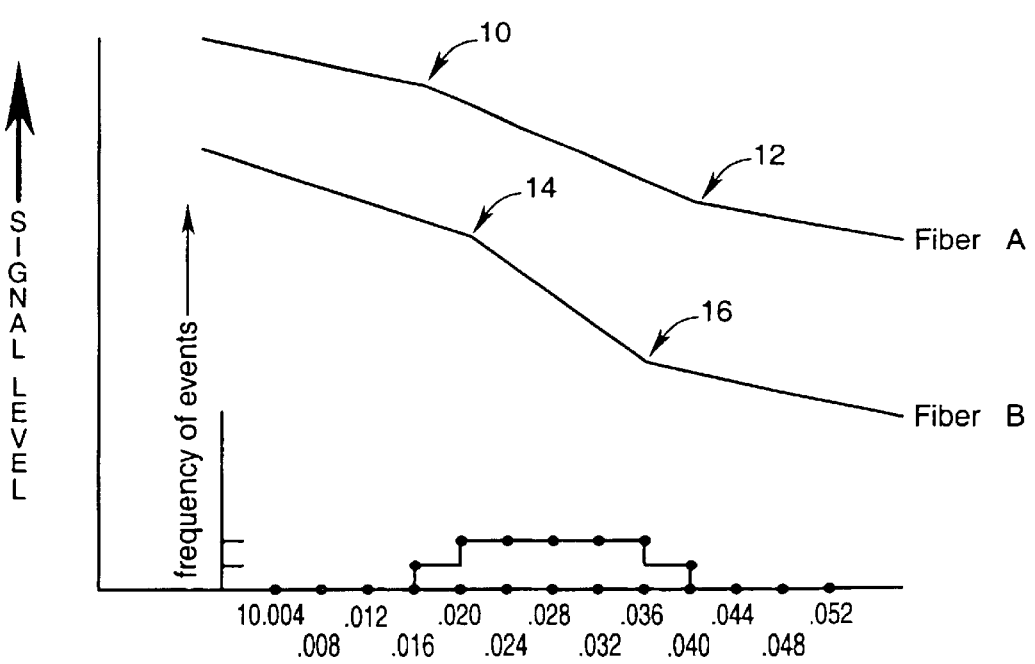
FIG. 6 is a schematic illustration of a detailed frequency distribution of events occurring at various distances along two of fibers in a cable.

FIG. 6 shows a detailed trace for each of two fibers showing an event happening at approximately the same location in each fiber. In the example, the sampling or data points are spaced at intervals of four meters. FIG. 6 also shows a frequency distribution chart indicating the numbers of times that an event is occurring in the fibers under analysis (in the example shown in FIG. 6, two such fibers). In fiber A, the trace indicates the start 10 of the event and the end 12 of the event, and in fiber B, the trace indicates the start 14 of the event, and the end 16 of the event. These traces are in idealized, straight line slopes of attenuation loss, and in reality, the attenuation, especially in the region of an event, may be non-linear.

FIG. 6 also shows a frequency distribution, that is, the frequency with which the fibers under analysis have an event occurring (i.e., between the start of the event and the end of the event) at a distance along the optic fiber. In the example, the maximum frequency is two and the minimum frequency is zero.

Figure 7:
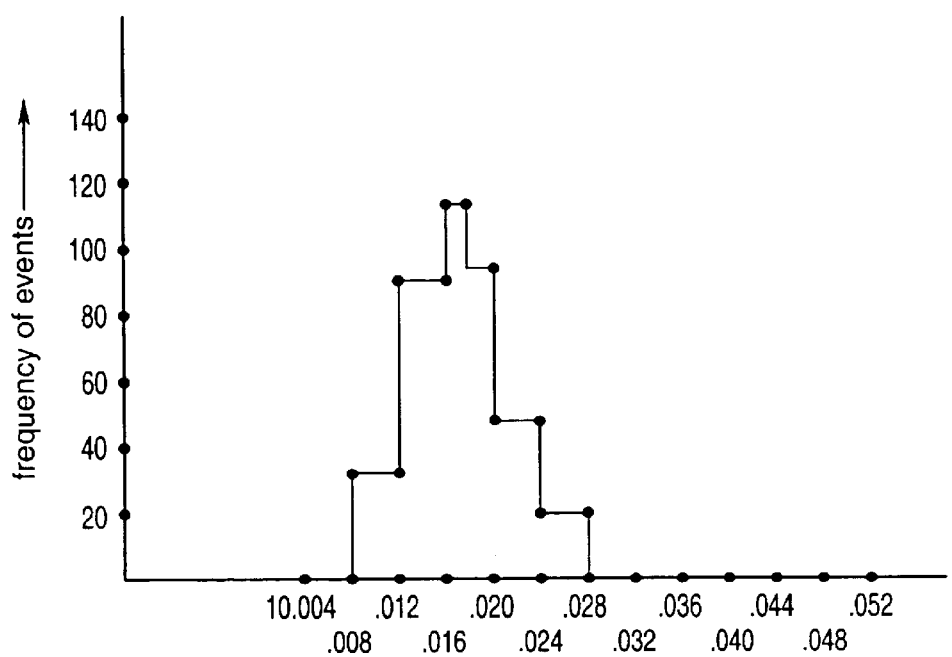
FIG. 7 is another schematic illustration of a detailed frequency distribution of events occurring at distances encompassing a splice location along a plurality of fibers in a cable.

FIG. 7 is an illustration of a simple frequency distribution chart that may be obtained for a single event occurring in the fibers in a 432 count cable. The Y axis indicates the aggregate number of events occurring in 432 fibers, and the X axis indicates the distance along the fiber in data point sampling increments of four meters. The method of the present invention builds such a chart for all events and then uses such a frequency distribution chart to calculate an event start and end locations, the type of loss estimate, and LSA cursors locations and lengths, which will be used in a conventional manner to determine power loss for a splice type event occurring in each fiber.

Figure 8:
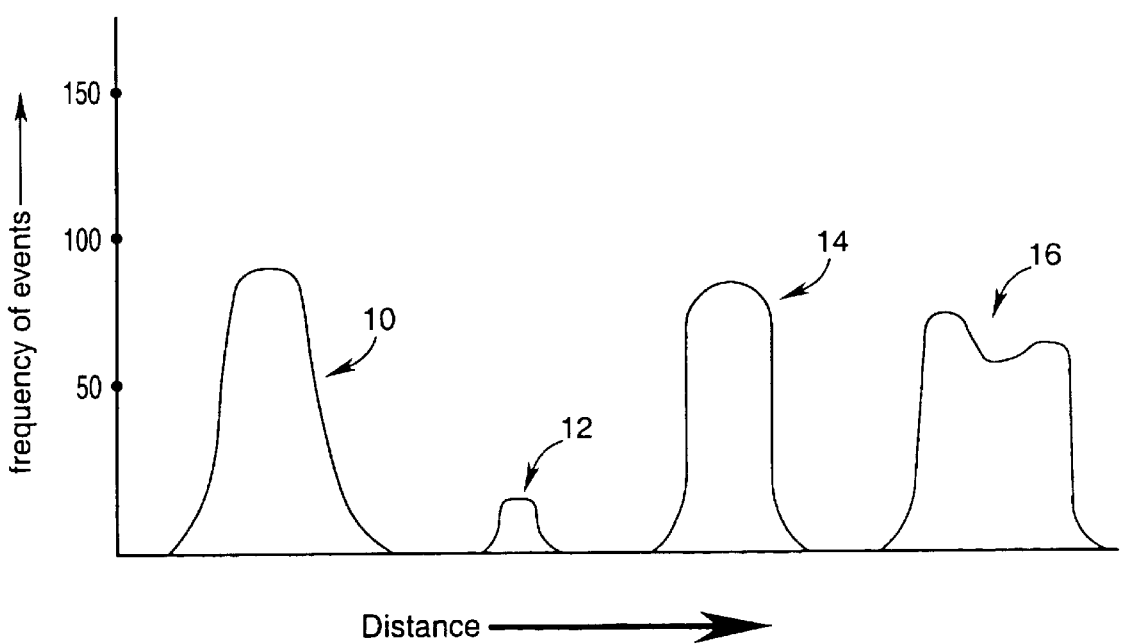
FIG. 8 is another schematic illustration of a detailed frequency distribution of events occurring at various distances along a plurality of fibers in a cable.
Figure 9A:
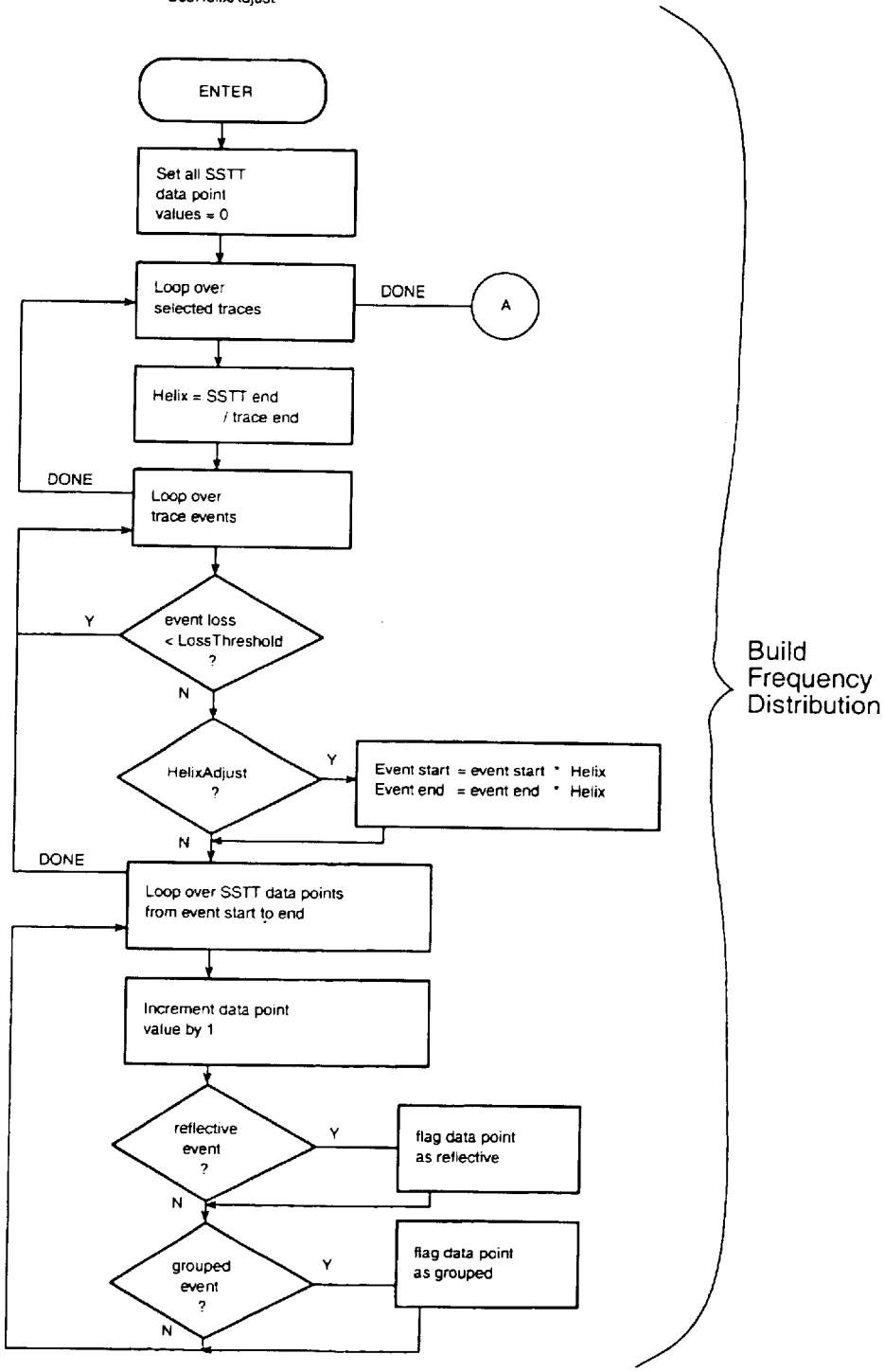
FIGS. 9 A–D is a flow diagram of a computer program that may be used in a preferred embodiment of the present invention.
Figure 9B:
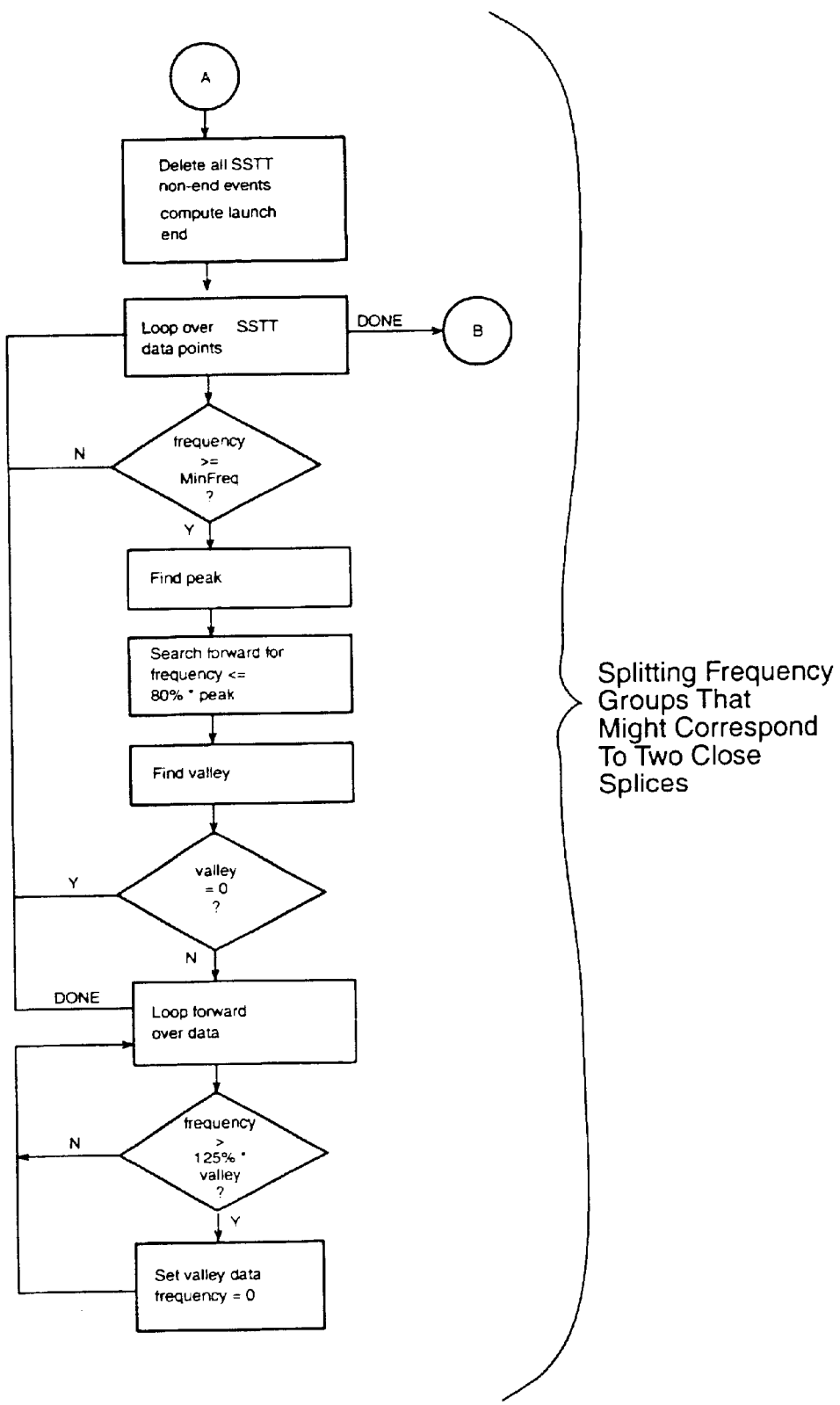
Figure 9C:
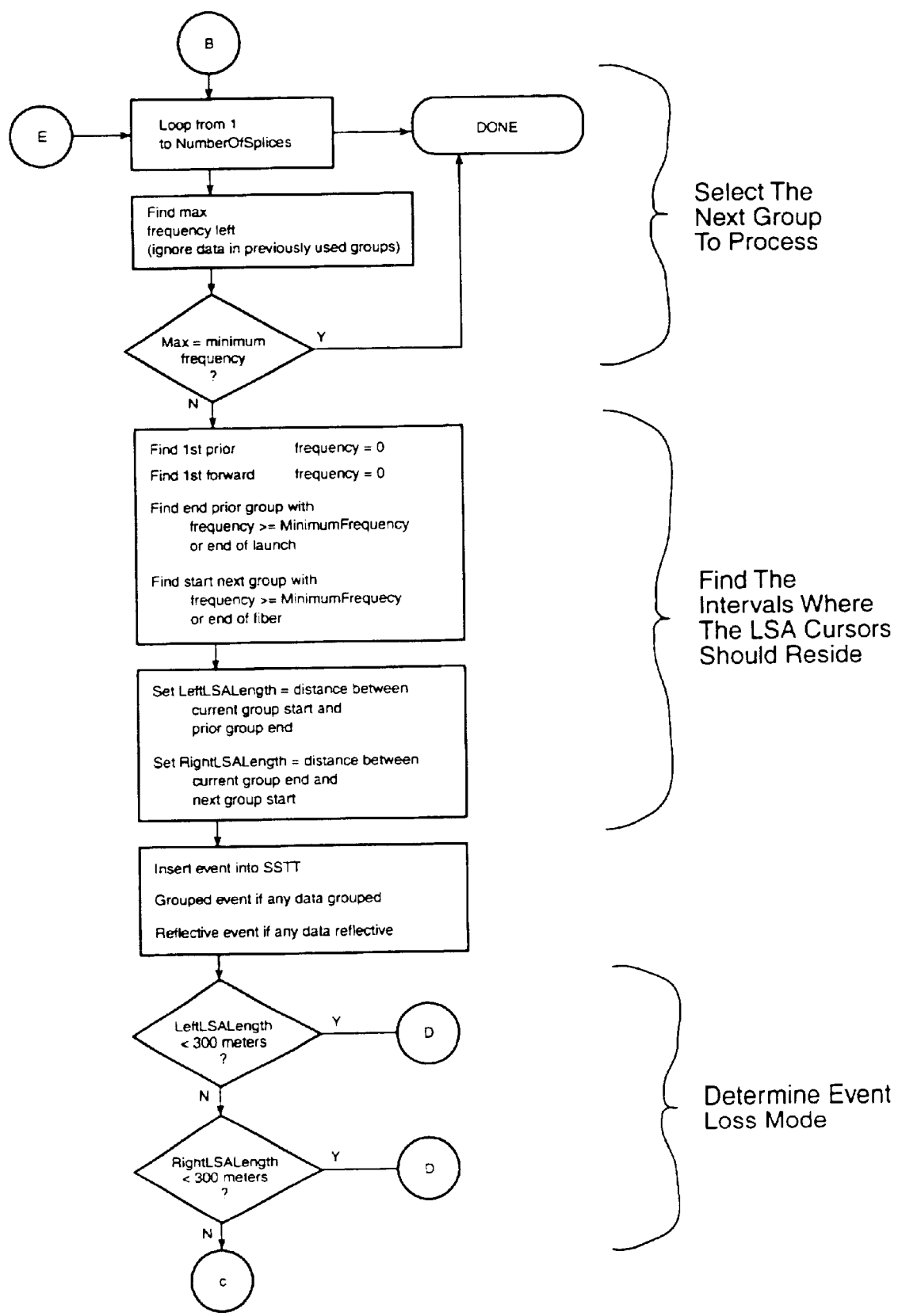
Figure 9D:
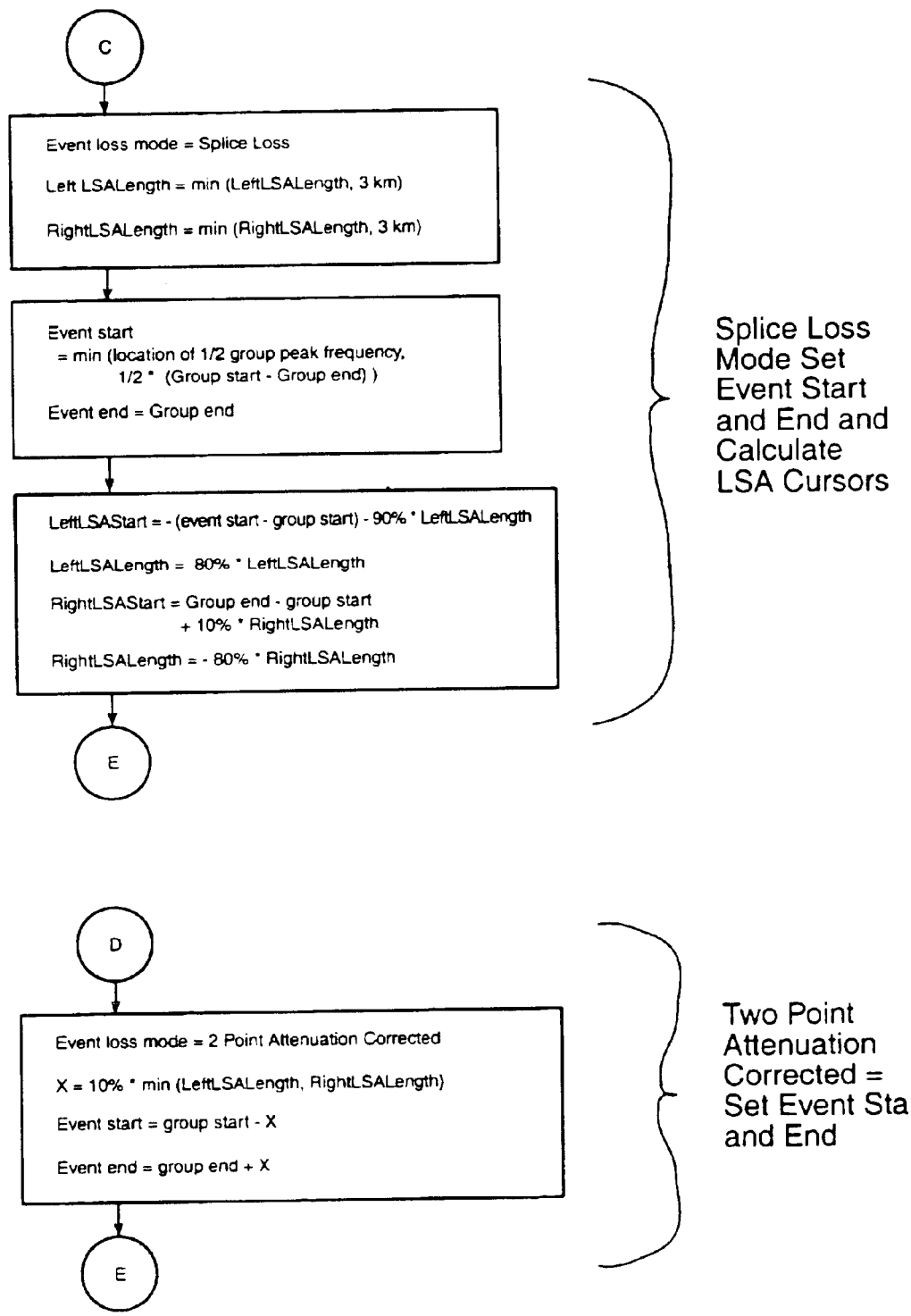

There is shown in FIG. 8 an exemplary frequency distribution chart that is created in accordance with the preferred embodiment of the present invention. The groups 10, 14 very probably represent splice locations in the optic fiber cable, and the group 16 very probably represents splice locations that are relatively very closely located along the cable. The group 12 probably indicates an anomaly in the cable, or might represent an exceptionally good splice.

There is shown in FIGS. 9A–D a flowchart entitled "Smart Splice Template Flowchart" that illustrates the logic procedure of computer software utilized in a preferred embodiment of the present invention to create a frequency distribution chart such as that shown in FIG. 8 and to calculate an event start and end locations, the type of loss estimate, and LSA cursors locations and lengths, which will be used in a conventional manner to determine the power loss of splices in the optic fiber cable. Initially, the technician or user specifies values for the number of splices, the loss threshold, the minimum frequency, and whether a helix adjustment is to be made. Normally the technician knows the number of splices that should be present in the cable and enters that number. If the user is in doubt, then the user may estimate the numbers of splices. The loss threshold is usually expressed in decibels and indicates a decibel loss of an event according to conventional Fiber Analysis Software (FAS) utilized to analyze the traces. The minimum frequency is the minimum numbers of times an event happens at a particular distance for the events to be considered as having been caused by a splice. The helix adjust is simply an on/off switch which will regulate whether the software performs an adjustment for a cable that contains helically wrapped optic fibers, as previously discussed. Each of these four input variables may be selectively adjusted and changed by the user. The user selected input data is entered into the computer program.

Initially, all of the data point values are set at zero, that is, the frequency distribution at all distances along the cable is set at a zero value. In a sense, the "slate is wiped clean" in preparation for the creation of a frequency distribution chart. Next, the computer program contains a loop that operates over any number of traces selected by the user. The user may select all of the traces in a cable, or may select only some of the traces in the cable. The program then executes with respect to one trace at a time until all of the traces selected by the user have been processed. As part of the loop, the computer program will calculate the end event for each trace for purposes of later applying a helix adjustment factor.

Next, each trace selected by the user is processed to determine where the magnitude of power loss in any event (according to the FAS) exceeds the loss threshold selected by the user. If the power loss of the event is too low, then the event will no longer be considered by the computer program. If the magnitude of the power loss of the event exceeds the loss threshold, then the helix adjustment factor may be applied to event start point and the event end point represented by the vertical dashed lines in FIG. 3.

Next, the computer program includes a loop routine which notes the extent of each event where the power loss exceeds the loss threshold selected by the user from the start of the event to the end of the event and then increments each data point by a value of one along the distance, that is, within the region between the event start point and the event end point for each event. Next, the computer program decides according to predetermined criteria whether the event includes characteristics evidencing a reflective event, and if so, flags all of those data points as being a reflective event, and thereafter determines whether the event is a so-called "grouped" event, and if so, flags all data points within the event as being grouped. Usually a grouped event in a trace has a shape indicative of two anomalies very close together, such as two splices.

Figure 1:
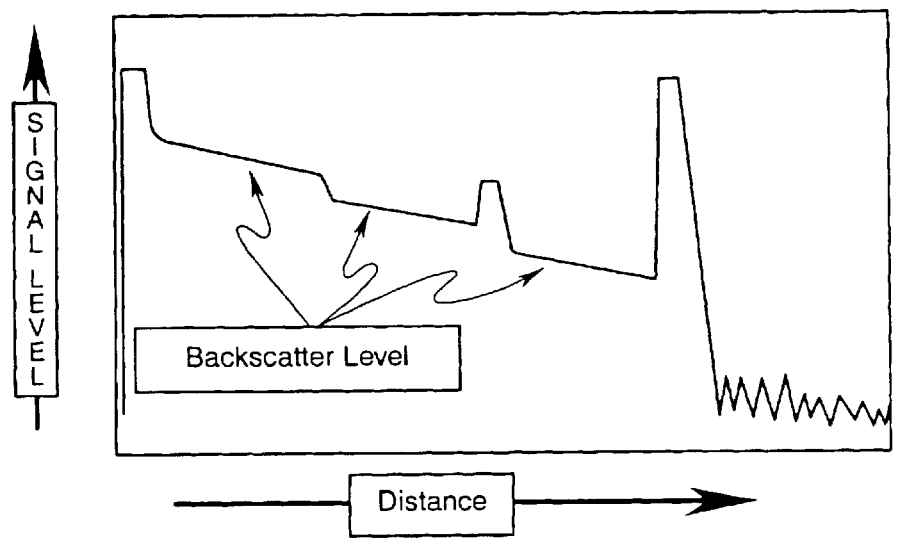
FIG. 1 is an exemplary trace of conventional, idealized signal level over a distance in an optic fiber.
Figure 2:
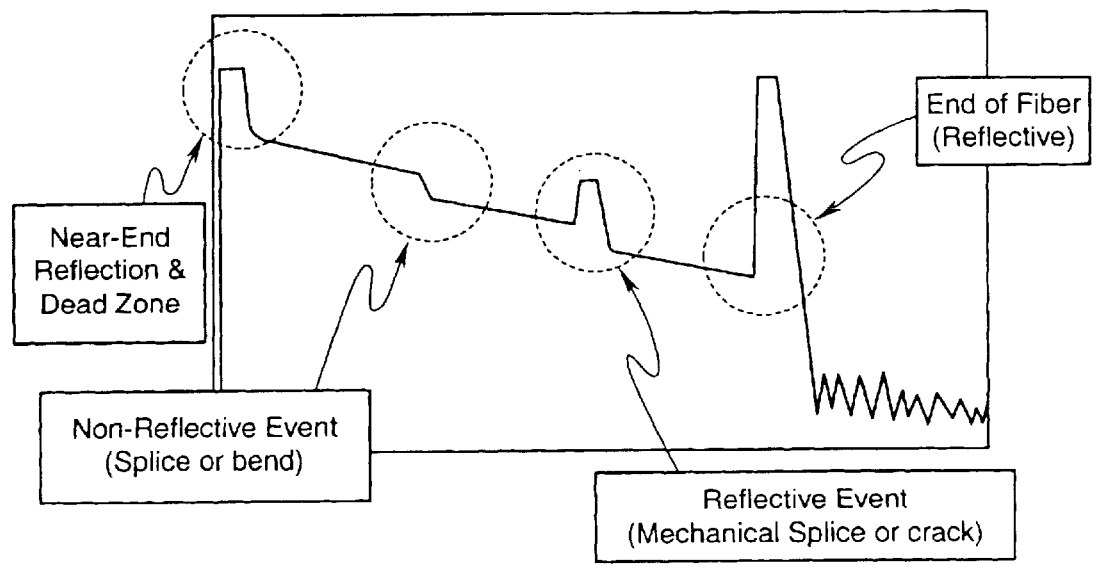
FIG. 2 is a schematic illustration of the trace shown in FIG. 1 denoting certain types of events indicated by the trace.

The computer program then discards all non-end events, that is, the computer program is throwing away the non-end events, but not the data point frequencies or values. At this stage, the computer program is no longer working with a trace waveform, but instead is simply working with frequency distribution groups. The computer program then computes the launch end point, that is, where gradual attenuation starts immediately after the near-end reflection end or dead zone shown in FIG. 2. At this point in the computer program, what is being processed is frequency data along the distance of the cable, created by the splice type events on each trace that meet the user's loss threshold criteria. Next, the computer program searches whether the frequency (that is, the number) at any particular location along the cable exceeds or equals the minimum frequency selected by the user. If the frequency exceeds the minimum frequency, then the computer program finds the peak of the frequency group, that is, the greatest frequency. Then the computer program searches forward, that is, downstream, for a frequency that is less than or equal to eighty percent of the numerical value of the maximum frequency at the peak. The computer program searches for a valley, that is, searches for a frequency distribution such as that shown by group 16 on FIG. 8, however, if there is no valley, then the computer program will eventually find a frequency equal to zero, which indicates that the frequency distribution group is like the groups 10, 14 in FIG. 8. If there is no valley, then the computer program will search downstream for the next occurrence where the frequency of data points equals or exceeds the minimum frequency selected by the user and repeat the process. If the computer program has found a valley, then the computer program searches downstream of the valley and determines whether the frequency of data points climbs to a value greater than 125 percent of the minimum frequency at the lowest point in the valley. If not, then the computer program will disregard the valley, and if so, the computer program will artificially set the frequency of the low point of the valley at zero, thereby in effect, artificially creating two separate, closely adjacent groups.

At this point in time in the computer program, the program has created a number of frequency groups and split frequency groups that have a large valley between two peaks above the minimum frequency. Next, the computer program starts another loop and searches for the number of frequency distribution groups (where the frequency value exceeds the minimum frequency selected by the user) and will select the group having the highest frequency, then the group having the next highest frequency, etc., up to the number of groups equal to the number of splices preselected by the user. If the user specified ten splices and there are twenty frequency groups above the minimum frequency selected by the user, then the computer program will select the ten highest groups. If the user specified ten splices, and the computer program has found only nine groups having frequencies above the minimum frequency set by the user, then the computer program will stop after selecting the nine groups.

When the computer program has found groups equal to or exceeding the minimum frequency value group selected by the user, the program will then process one frequency distribution group at a time. The program then searches for the first prior location (i.e., to the left) where the frequency value is zero and then finds the first forward point (i.e., to the right) where the frequency value is zero. Next, the computer program finds the prior frequency group, if any, where the frequency equals or exceeds the minimum frequency value selected by the user. If there is no such prior group, then the computer program will use the end of launch point. The computer program then locates the following or next frequency group possessing a frequency that equals or exceeds the minimum frequency value selected by the user. If there is no such group, then the computer program will use the end of the optic fiber.

The computer program then generates LSA cursors, which will have a computed length and which will be placed at a selected position relative to each frequency distribution group. The length of the left LSA cursor length equals a distance between where the frequency group starts (the first zero frequency value to the left of the group) and the end of the prior frequency distribution group (the first frequency value of zero to the right of the prior frequency group). If there is no prior frequency group, then to the launch end. The right LSA length is determined to be the distance between the end of the frequency distribution group (the first zero to the right of the frequency group) and the start of the next frequency group (the first zero to the left of the next, downstream frequency group). If there is no later frequency group, then to the end of the fiber.

The computer program then determines whether any frequency data in any of the frequency groups was caused by a grouped event, as determined by the FAS program, and if so, the computer program will set the event type to grouped. The computer program then also determines whether any of the data in the frequency group was generated by a reflective event, as determined by the FAS program, and if so, the computer program sets the vent type to reflective.

The computer program then assesses whether the left LSA cursor length is less than 300 meters and if the right LSA cursor length is less than 300 meters, and if either of these conditions exists, then the computer program sets the event loss mode to a two-point attenuation corrected calculation of the power loss. In connection with the two-point attenuation corrected calculation, the computer program calculates a value "X" which is equal to ten percent of the left LSA cursor length or the right LSA cursor length, whichever is lesser. In determining the group event start point for all of the events in all of the traces that have created the associated frequency distribution group, the computer program sets the group event start as equal to the distance "X" before the first zero to the left of the group, and will calculate the end the group event as occurring at a distance "X" downstream from the first zero to the right of the associated frequency group. The computer program would perform this type of analysis with respect to the frequency group 16 as shown in FIG. 8 (remembering that the computer program has already artificially created a zero frequency value at the lowest point of the valley between the two peaks in the frequency group 16). All of the events happening in all of the traces between such a group event start point and a group event end point as calculated by the computer program will have a two-point attenuation correction analysis performed to determine the power loss (i.e., the drop in signal value from the event start point to the event end point corrected by normal fiber attenuation) so that the power loss can be calculated over each trace.

If the left LSA cursor length and the right LSA cursor length each equal or exceed 300 meters, then the computer program sets the event loss mode to splice loss which will later apply an LSA power loss analysis. If the left LSA length is greater than three kilometers, then the left LSA length will be set at three kilometers, and if the left LSA length is less than three kilometers, then the computer program will leave the left LSA length at its actual value. Likewise, if the right LSA length is greater than three kilometers, then the computer program will set the right LSA length at three kilometers, and if the right LSA length is less than three kilometers, then the computer program will leave the right LSA length at its actual value.

The event start for the LSA analysis is then determined. The computer program selects the one-half width point of the frequency group (between the zero frequency points on either side of the group). The computer program then determines the location where a frequency value equal to one-half of the value of the peak or maximum frequency value in the group occurs at the "front" side of the group. The computer program will then compare whether the location of the one-half width of the group is prior to the location of the one-half peak frequency on the front side of the group, and if so, the event start is the distance where the one-half width occurs; otherwise, the event start is where the one-half peak value occurs. The event end is where the group ends at a zero value.

The computer program then determines where the starting point of each LSA cursor should be placed and further adjusts the length of each LSA cursor. The start point of the left LSA cursor is at a position prior to the frequency group equal to minus the distance between the group start and the group start minus ninety percent of the left LSA length previously calculated (three kilometers or less). The left LSA length is adjusted to equal eighty percent of the prior left LSA length value. Similarly, the starting point of the right LSA cursor must be determined, and the computer program selects a point to the right of the frequency group that is equal to the distance between the group end and the group start plus ten percent of the right LSA length previously calculated (three kilometers or less). The right LSA length is further adjusted to equal eighty percent of the previously calculated right LSA length.

The event start and the LSA cursor locations and lengths as calculated by the computer program are then applied in a conventional manner to each of the traces to calculate a power loss for each of the traces.

Whether the computer program calculates power loss according to the two-point attenuation corrected method or according to the LSA method, a power loss report can be generated using conventional computer program technology.

FIGS. 10 and 11 show typical types of reports that can be generated according to the preferred embodiment of the present invention. The format of the report shown in FIG. 11 is conventional. In the report shown in FIG. 11, the conventional report program has highlighted any power loss greater than 0.25 decibels. Thus, the report may readily show where a splice on a particular optic fiber might need to be repaired and might readily show either superior work or inferior work in splicing all fibers of a cable at a particular splice point.

Figure 12:
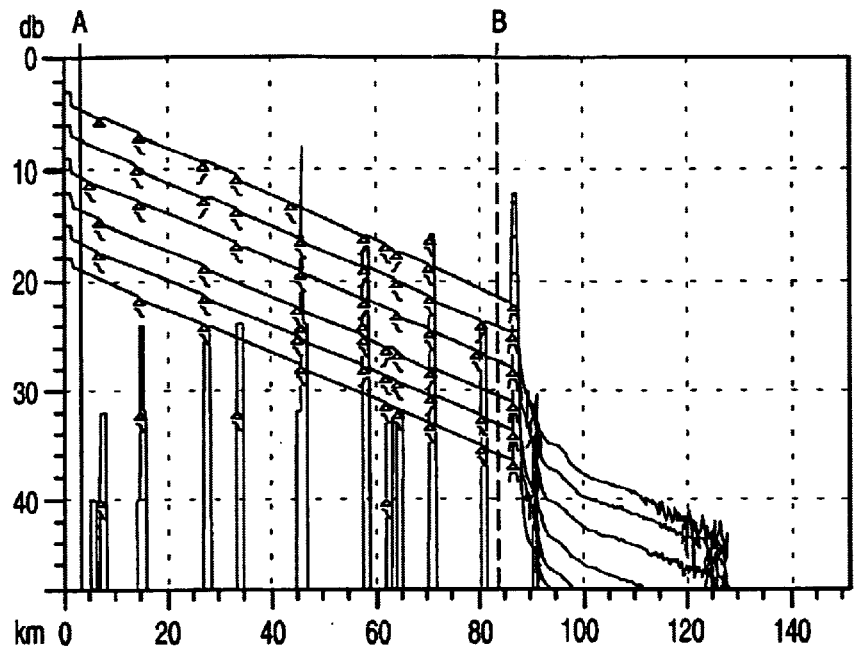
FIG. 12 depicts a schematic illustration of traces of signal loss in six optic fibers in a cable with an overlay of a frequency distribution chart of events occurring in the traces.
Figure 13:
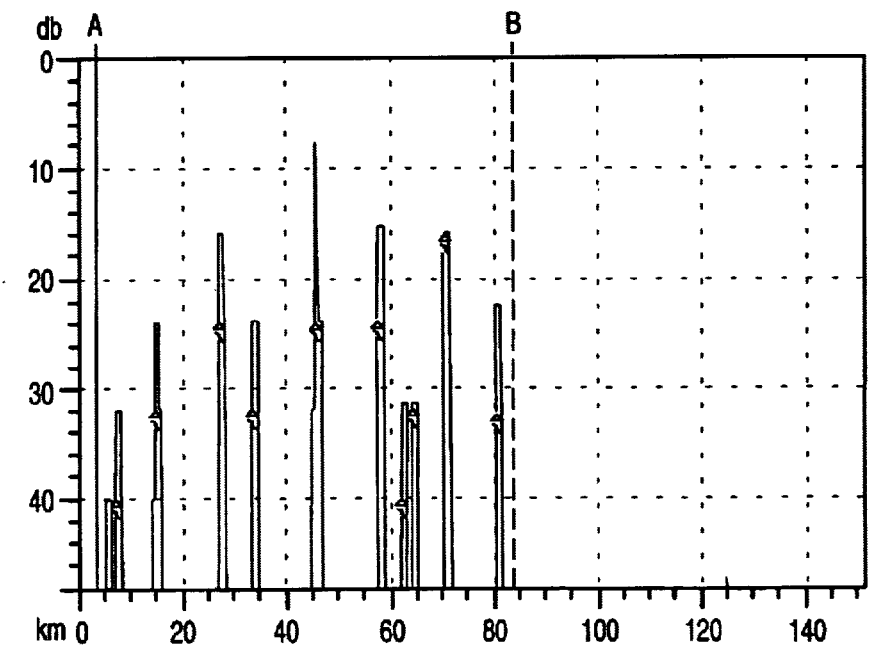
FIG. 13 depicts the frequency distribution shown in FIG. 12 without the traces.

FIGS. 12 and 13 illustrate a frequency distribution chart displayed in accordance with the present invention. It should be noted that the chart is a bar graph connecting the frequency values of large numbers of data points. Although the lines appear to be straight and smooth at a relatively large resolution such as is shown in these figures, finer resolution will reveal a much more jagged profile.

FIGS. 14A through I is a source code in C++ language for a computer program that may implement the foregoing process according to a preferred embodiment of the present invention.

The power loss may be calculated using a computer program, in well-known manner, and the computer program may print a chart of the attenuation power loss for the events on each fiber in a conventional, well-known manner.

In certain extreme situations, the optic fiber may be extremely noisy such that the frequency distribution never or rarely drops to zero. In such situations, the invention contemplates that any frequency numbers below a cap, such as four, will be ignored and effectively treated as being zero frequency so that the foregoing methodology may be employed. It should be appreciated that under this particular methodology, certain events will be ignored when analyzing the frequency distribution data.

It is also contemplated within the scope of the present invention that a frequency event distribution must achieve a certain threshold value before any meaning is given to the frequency value in the frequency distribution chart. For example, in a 432 count cable, if there is a small magnitude of frequency value in a group, such as 4, 5, 2, 3, 4, 1, 0, then the methodology may ignore the frequency group, since the traces of only very few fibers indicate that an event has occurred. The threshold value may be selected at any value.

The methodology of the present invention permits the location of splices and the placement of LSA cursors for power loss calculations to be readily determined and permits what is believed to be a more accurate determination of power loss for each splice in each fiber. Such information is important to cable owners so that any loss exceeding a prescribed amount at any splice may be cause for requiring corrective action to be taken to minimize or eliminate the loss at that event. For example, a poor splice of a fiber end to another fiber end might need to be redone or otherwise improved. The present invention may also be used to readily ascertain whether a particular contractor who places the cable is satisfying criteria for the maximum number of splices having an excessive power loss, and to determine whether the particular work crew is performing satisfactory work on the cable.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A method of determining the location of splices in a plurality of optic fibers in a cable comprising the steps of:
    obtaining a light signal attenuation trace for each of a plurality of fibers in said cable;
    designating as events selected occurrences on each trace where the power loss exceeds a predetermined magnitude;
    determining the location and extent of occurrence of each event;
    characterizing each of said events into one of a plurality of preestablished types; and
    creating a frequency distribution representative of the number of events occurring at each of a series of location points along said cable.

2. The method of claim 1 comprising the further step of adjusting the location of each event based upon differences in the total length of each of said plurality of optic fibers in said cable.

3. The method of claim 1 wherein said frequency distribution is created whereby said frequencies are grouped in one or more groups, each group having a maximum, peak frequency value and bounded by zero frequency values.

4. The method of claim 3 comprising the further step of determining whether a group possesses a predetermined valley configuration, and if so, setting at least one group start point and at least one associated group end point and performing essentially a two-point attenuation correction method of determining power loss for each trace between each said group start point and each said associated group end point.

5. The method of claim 3 comprising the further steps of setting for substantially each group a group start point, at least one associated LSA cursor start point, and at least one associated LSA cursor end point and thereafter performing essentially an LSA method of determining power loss for each trace at said group start point.

6. A substantially automated, non-manual method of determining the location of splices in a plurality of optic fibers in a cable comprising the steps of:
    obtaining a light signal attenuation trace for each of a plurality of fibers in said cable;
    designating as events selected occurrences on each trace where the power loss exceeds a predetermined magnitude;
    determining the location and extent of occurrence of each event;
    characterizing each of said events into one of a plurality of preestablished types; and
    creating a frequency distribution representative of the number of events occurring at each of a series of location points along said cable.

7. The method of claim 6 comprising the further step of adjusting the location of each event based upon differences in the total length of each of said plurality of optic fibers in said cable.

8. The method of claim 6 wherein said frequency distribution is created whereby said frequencies are grouped in a one or more groups, each group having a maximum, peak frequency value and bounded by zero frequency values.

9. The method of claim 8 comprising the further step of determining whether a group possesses a predetermined valley configuration, and if so, setting at least one group start point and at least one associated group end point and performing essentially a two-point attenuation correction method of determining power loss for each trace between each said group start point and each said associated group end point.

10. The method of claim 8 comprising the further steps of setting for substantially each group a group start point, at least one associated LSA cursor start point, and at least one associated LSA cursor end point and thereafter performing essentially an LSA method of determining power loss for each trace at said group start point.

* * * * *